US006240098B1

United States Patent
Thibault et al.

(10) Patent No.: US 6,240,098 B1
(45) Date of Patent: May 29, 2001

(54) METHOD AND DEVICE FOR SPACE DIVISION MULTIPLEXING OF RADIO SIGNALS TRANSMITTED IN CELLULAR RADIO COMMUNICATIONS

(75) Inventors: Joël Thibault, Nanterre; Pascal Chevalier, Courbevoie; François Pipon, Paris; Jean-Jacques Monot, Courdimanche; Gilbert Multedo, Vaureal Cergy, all of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/011,477

(22) PCT Filed: Aug. 22, 1996

(86) PCT No.: PCT/FR96/01307

§ 371 Date: Feb. 20, 1998

§ 102(e) Date: Feb. 20, 1998

(87) PCT Pub. No.: WO97/08849

PCT Pub. Date: Mar. 6, 1997

(30) Foreign Application Priority Data

Aug. 22, 1995 (FR) .................................. 95 09975
Aug. 22, 1995 (FR) .................................. 95 09976

(51) Int. Cl.[7] .............................. H04Q 7/00; H04L 1/00; H04B 1/58; G01S 3/18
(52) U.S. Cl. ......................... 370/431; 370/329; 375/346; 455/562; 342/378
(58) Field of Search ................................. 370/312, 320, 370/321, 330, 337, 343, 347, 442, 478–480, 310, 431; 455/500, 501, 504, 506, 272, 63, 67.1, 132, 133, 134, 136, 440, 561, 562; 375/262, 229, 347, 346, 349, 350; 342/373, 383, 378

(56) References Cited

U.S. PATENT DOCUMENTS

| 5,299,148 | * | 3/1994 | Gardner et al. ....................... 702/196 |
| 5,473,333 | * | 12/1995 | Chiba et al. ........................... 342/378 |
| 5,566,209 | * | 10/1996 | Forssen et al. ....................... 375/262 |
| 5,592,490 | * | 1/1997 | Barratt et al. ........................ 370/310 |
| 5,615,409 | * | 3/1997 | Forssen et al. ....................... 455/440 |
| 5,642,353 | * | 6/1997 | Roy, III et al. ....................... 370/329 |
| 5,752,168 | | 5/1998 | Monot et al. . |
| 6,101,399 | * | 8/2000 | Raleigh et al. ....................... 455/561 |

* cited by examiner

*Primary Examiner*—Wellington Chin
*Assistant Examiner*—Steven Nguyen
(74) *Attorney, Agent, or Firm*—Oblon, Spivak, McClelland, Maier & Neustadt, P.C.

(57) ABSTRACT

A method and apparatus for spatial multiplexing and demultiplexing of radio signals. A multichannel transmitter and receiver is integrated in a base station and coupled to an antenna array. Using digital radio signals containing previously known or non-Gaussian sequences and arranged in frames, the spatial information about each mobile unit is estimated on the basis of the signal received by the receiver for the reception and transmission frequencies. This is done by known sequences or by blind source separation methods. The respective paths of each mobile unit with the power above a predetermined threshold is isolated by spatial filtering in the presence of multiple channel paths in order to provide spatial demultiplexing. Simultaneously, the intended signal is transmitted in the direction of the main path of each mobile unit while protecting each mobile unit from signals transmitted in the direction of other mobile units by spatial filtering with cancelling constraints in order to provide spatial multiplexing.

26 Claims, 10 Drawing Sheets

METHOD AND DEVICE FOR SPACE DIVISION MULTIPLEXING OF RADIO SIGNALS TRANSMITTED IN CELLULAR RADIO COMMUNICATIONS

BACKGROUND OF THE INVENTION

1. Field of the Invention

The present invention relates to a method and a device for space division multiplexing/demultiplexing of radio signals which are organized in frames and are transmitted in duplex on the same frequency and time channel, requiring no setting. It applies, in particular, to cellular radio communications between at least one base station and a plurality of mobile units.

2. Discussion of the Background

With the constant increase in demand for mobile communications and the limitation on the number of channels allocated to the operators of cellular radio communications networks, saturation problems will become critical in future years.

Conventional techniques currently make it possible to multiplex communications in frequency division (FDMA), in time division (TDMA) or in code division (CDMA).

FDMA (Frequency Division Multiple Access) consists in allocating a pair of frequencies to each communication (one for the down path and one for the up path). On its own, this very simple multiplexing technique affords substantially no opportunity for improving spectral efficiency.

TDMA (Time Division Multiple Access) consists in allocating a precise time interval to each communication. On its own, this technique which has already been optimized to improve the spectral efficiency within the scope of wireless transmission by utilizing the gaps present in the speech signal, gives little likelihood of further improvement in this regard.

CDMA (Code Division Multiple Access) consists in allocating each communication a code defining a frequency hop law over short time intervals. Although it does allow some improvement in the spectral efficiency (progressive saturation by signal degradation rather than abrupt saturation by service interruption, as in the case of the previous two techniques), this method remains involved and expensive to implement.

A number of ways of improving the capacities of cellular communications systems are currently being investigated, namely: diversification of the cells and the waveforms, with the use of smaller and smaller cells ("microcell" and "nanocell" of the ATDMA calibration project, referring to "Advanced Time Division Multiple Access", for urban areas), and in particular a new multiplexing method which can be combined with existing techniques: Space Division Multiple Access (SDMA).

This technique is based on the idea that the radio signals corresponding to a plurality of links between a base station and mobile units may, in many cases, be spatially decorrelated.

Utilizing this decorrelation makes it possible to separate the spatial channels (even if they all occupy the same frequency and time channel) using a multipath transmission/reception system associated with an antenna base tailored to the frequency range which is used.

A number of methods using this concept have already been proposed. A first method is based on techniques for estimating direction of arrival, such as the system described in the patent by Richard Roy (US patent PCT/US92/10074, December 1991, entitled "Spatial Division Multiple Access Wireless Communication System"). A second method uses cyclostationarity characteristics of digital transmission signals to separate them by blind processing operations (U.S. Pat. No. 5,260,968, of Sep. 11, 1993, entitled "Method and Apparatus for Multiplexing Communications Signals through Blind Adaptive Spatial Filtering" by William A. Gardner and Stephan V. Schell).

For the first method, estimation of the directions of arrival of various radio sources on the basis of the signals received on an antenna base requires perfect control over the wavefront, which leads to the constraint of calibrating the antenna base which is used. Further to the extra cost introduced by setting, the standard deviation of the indirect estimate of the direction vector on the basis of the estimated direction of arrival and the setting table of the antenna base is much greater than that obtained by direct estimation methods. The direction vector corresponds to the value taken by the transfer function of the antenna base for the azimuth, elevation and carrier frequency of the incident electromagnetic wave transmitted by a source. This information is then used by the space division multiplex processing.

For the second method, 2nd order separation techniques using cyclostationarity require either differences in symbol rates or shifts in carrier frequencies of the signals to be separated in order to operate. These limitations make these techniques ill-suited to the channel configurations formed in radio communications between a base station and mobile units having decorrelated multiple routes which cannot be separated by the above methods and are therefore inoperable in most urban areas.

Lastly, to separate the various signals received, the antenna processing techniques mentioned above employ a so-called purely spatial filtering structure constituted by one complex gain per reception path. The anti-scrambling capacities of this type of structure, in terms of the number of independent interference sources which can be rejected (two decorrelated routes originating from the same source constitute two independent interference sources) are suboptimal. This is because the spatial filter adapts to one useful route followed by a source and rejects all the other routes, both the decorrelated useful routes followed by this source and the routes followed by the interference signals.

In the rest of the description, the terms "sensors" and "antennas" will be used interchangeably, as will the terms "multisensor", "multipath" and "multisensor array" and "antenna base", it being moreover known that an antenna base, or multisensor array, forms a number of transmission paths equal to the number of antennas or sensors.

SUMMARY OF THE INVENTION

The object of the invention is to overcome the deficiencies and limitations of the aforementioned methods.

To this end, the invention relates to a method for space division multiplexing/demultiplexing of radio signals which are organized in frames and are transmitted in duplex between at least one base station and a plurality of mobile units communicating on the same frequency and time channel by means of a multipath receiver and transmitter which are integrated in the base station and are coupled to an antenna base.

A first variant of the invention applies in particular to non-gaussian radio signals. The method relating to this first variant is characterized in that it consists:

in estimating the spatial information relating to each mobile unit on the basis of the signal received by the multipath receiver, for the reception and transmission frequencies, by means of blind source separation methods, and on the basis of this information, in isolating by spatial filtering, possibly in the presence of multiple routes in the channel, the respective routes to each mobile unit whose power is greater than a determined threshold to allow space division demultiplexing, and in simultaneously transmitting in the direction of the main route of each mobile unit, the signal which is intended for it, while protecting each mobile unit from the signals transmitted to the others by spatial filtering with cancelling constraints to allow the space division multiplexing.

A second variant of the invention applies to digital radio signals organized in frames, including sequences which are known a priori. The method relating to this second variant is characterized in that it consists:

in estimating the spatial information relating to each mobile unit, on the basis of the signal received by the multipath receiver, for the reception and transmission frequencies, by means of filtering methods, while utilizing the a priori known sequences, and on the basis of this information, in isolating, possibly in the presence of multiple routes in the channel, the respective routes to each mobile unit whose power is greater than a determined threshold, and in demodulating the signal received by each of the mobile units linked with the base station, to permit space division demultiplexing, and in simultaneously transmitting in the direction of the main route of each mobile unit, the signal which is intended for it, while protecting each mobile unit from the signals transmitted to the others by spatial filtering with cancelling constraints to allow the space division multiplexing.

The invention has a number of advantages.

One advantage of the first variant of the present invention is that it makes it possible, for estimating the direction vectors associated with the various mobile signals, to apply a blind source separation method requiring neither control over the wavefront nor a priori knowledge of the waveform (transparent method). To this end, the method according to the first variant of the invention utilizes the non-gaussian nature of the source signals. This assumption is satisfied for most modulations used in analogue or digital radio communications, in particular for constant-envelope modulations.

One advantage of the second variant of the invention is that it allows, for space-division multiplexing radio transmissions between a plurality of mobile units and a base station, techniques for adapting spatial or spatio-temporal filters on the basis of repetition (learning sequence), these techniques to date essentially having been used to combat scrambling in defence radio-communication systems. In particular for synchronization and equalization purposes, most digital cellular radio communications systems use learning sequences inserted in waveforms organized in frames. Using this information, which is a priori known, makes it possible to use processing operations which perform better and are less constraining in terms of the modulations used than so-called "transparent" techniques.

Among the methods described below when describing the second variant, those using spatio-temporal filtering structures (one FIR filter per path, FIR being an abbreviation for "Finite Impulse Response") make it possible, when there are multiple routes, to increase the capacities for rejecting interference signals and optimizing the error rate after demodulation of a multipath system, in comparison with narrow-band filtering structures (one coefficient per path); it is not necessary to have control over the wavefront, which allows an uncalibrated antenna base to be used; furthermore, the modulations compatible with these methods encompass all digital modulations, including gaussian waveforms.

BRIEF DESCRIPTION OF THE DRAWINGS

Other advantages and characteristics of the present invention will emerge more clearly on reading the following description, and the appended figures, in which.

multisensor spatio-temporal filter+single-sensor equalizer/demodulator, according to the second variant of the invention.

DISCUSSION OF THE PREFERRED EMBODIMENTS

In the figures, similar elements are denoted by the same reference.

Figure 1:
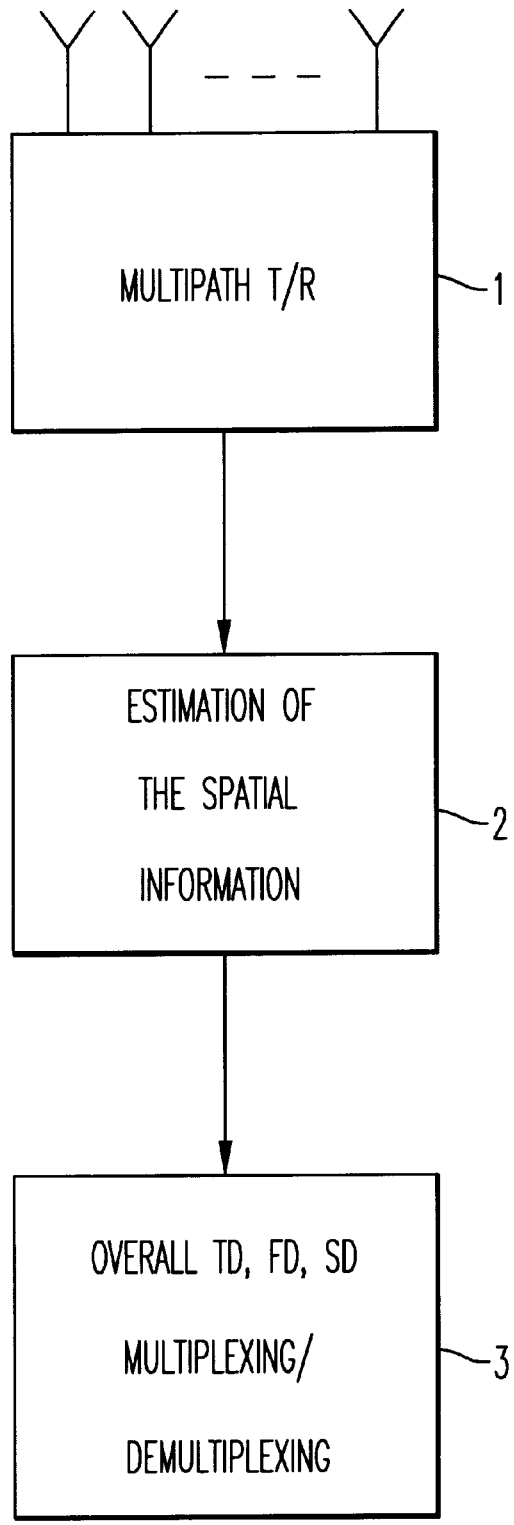
FIG. 1 depicts the main steps in the method according to the invention.

The method according to the first variant of the invention, the main steps of which are illustrated in FIG. 1, consists, on the basis of multipath transmission/reception 1, in estimating 2 the spatial information relating to each active mobile source present in the cell at the two frequencies which alternately support the transmission and the reception, then, on the basis of this information, in producing optimum global (time division, frequency division and space division) multiplexing/demultiplexing 3 of the communications.

The spatial information characterizing a mobile unit is defined by the direction vectors of the multiple routes of the signal received on the antenna base.

These direction vectors represent the response (amplitude and phase) of the antenna base to a signal incident with an azimuth characteristic of the position of the source.

The estimation 2 of the direction vectors of each source uses signals received from the source of interest in single-transmission configuration. In other words, a periodic time range, hereafter referred to as a burst, in the waveform organized in frames is allocated to each mobile unit for updating its spatial information. The method applied for this estimation 2 therefore utilizes the non-gaussian nature of the source signals to be processed and operates perfectly when there is no setting of the antenna base. However, in view of the generally large difference between the frequencies of the up (mobile units to base station) and down (base station to mobile units) links, the estimate made on the received signals and used for spatial filtering in reception cannot be transposed for the spatial filtering in transmission. This is why, in the method according to the first variant of the invention, periodic permutation of the groups of frequencies of the up and down links may be carried out so as to permit learning and updating of the spatial information at the transmission frequencies as well.

Most base stations manage a plurality of frequency channels in duplex mode, and in this context the method according to the first variant of the invention may allow overall management of these channels, within which channels the space division multiplexing generates SDMA sub-channels, so as to group the least spatially correlated mobile units on the same frequency and time channel.

Furthermore, the method according to the first variant of the invention updates the coefficients of the spatial filters in reception and transmission, respectively producing space division demultiplexing and space division multiplexing while taking into account the pairing errors due to residual setting errors of the paths in transmission and reception.

Figure 2:
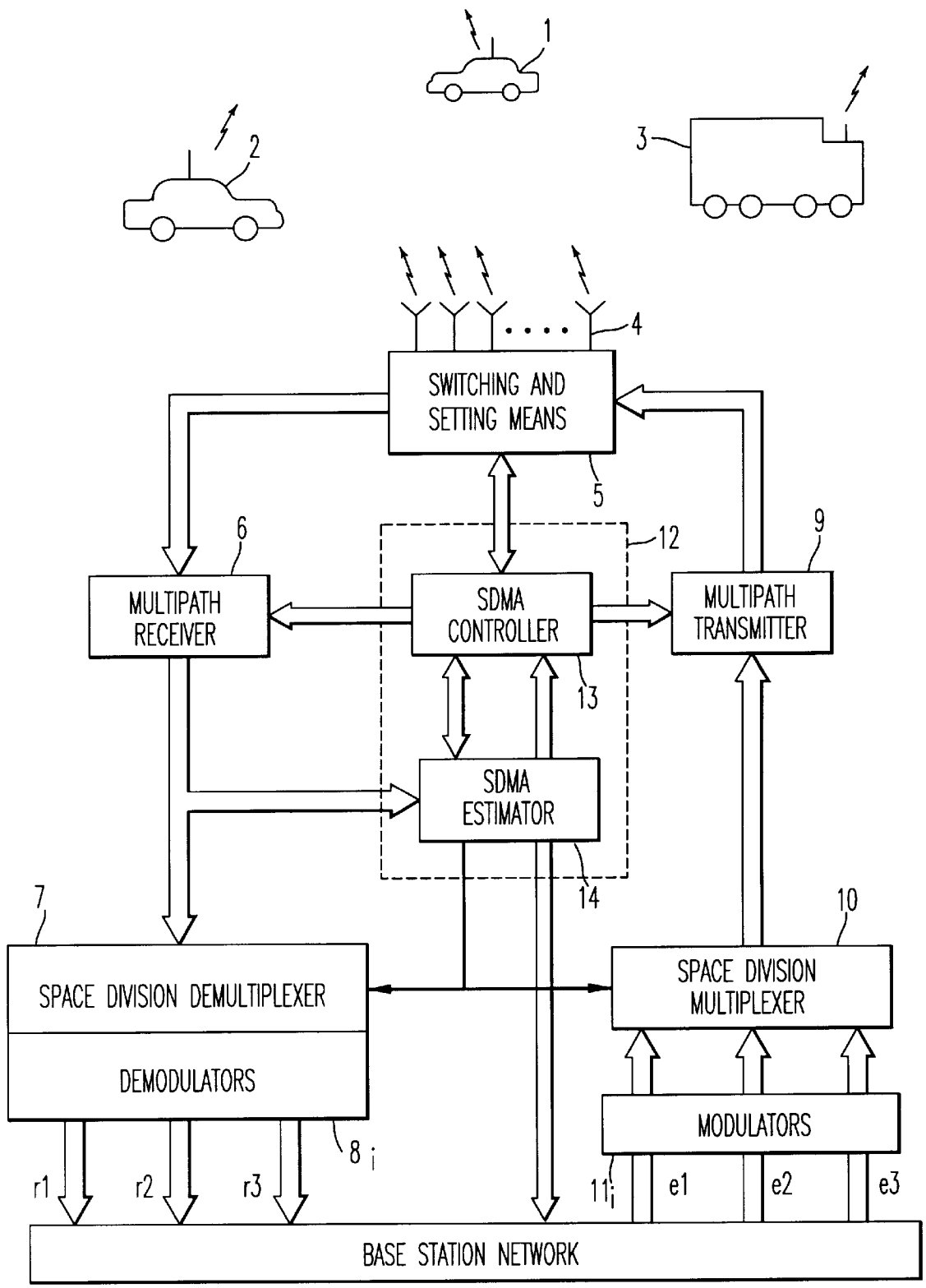
FIG. 2 depicts a block diagram of a device for implementing the method according to the invention.

A device for implementing the method according to the first variant of the invention is schematized by FIG. 2 and includes the following sub-assemblies:

- an antenna base 4 coupled to frequency switching and setting means 5,
- a multipath receiver 6 including radio transposition/amplification means and multipath analogue/digital conversion means (not shown),
- a space division demultiplexer 7,
- a determined number of demodulators 8$i$ equal to the maximum number of spatial channels fixed per frequency channel, for example three demodulators for a base having ten antennas,
- a multipath transmitter 9 including radio transposition/amplification means and multipath digital/analogue conversion means (not shown),
- a space division multiplexer 10,
- a determined number of modulators 11$i$ equal to the number of demodulators 8$i$ of the multipath receiver 6,
- a digital processing module 12, delimited by a closed line of dashes, including a controller 13 and an estimator 14 which are specific to the SDMA processing, which lies at the heart of the device for implementing the method according to the first variant of the invention.

By the hardware which it requires, the processing constraints applied and the new possibilities which it affords, implementation of the SDMA concept by means of blind source separation methods requires a high level of system accountability. This entails a number of control and management tasks which are essential for optimum integration of space division multiplexing in cellular radio communications networks. In the device for implementing the method according to the first variant of the invention, these control and management tasks are performed by the digital processing module 12.

The separation in the base station of the signals originating from or intended for the various "active" mobile units, that is to say the ones in communication with the base station, within a determined cell entails acquiring and updating the spatial information specific to each mobile, and for this purpose requires that the processing be synchronized.

Figure 3:
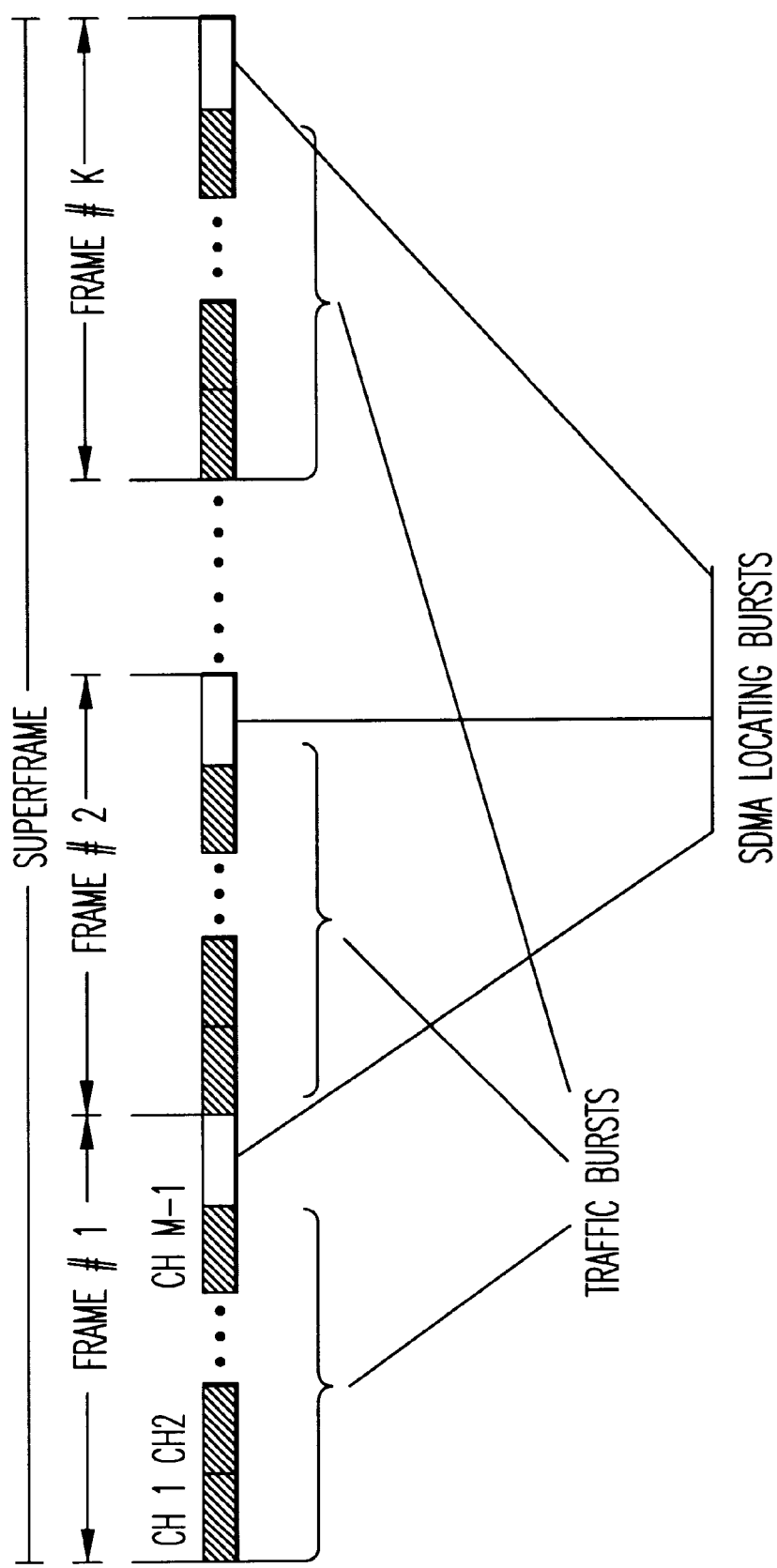
FIG. 3 depicts an example of a structure of a "superframe" taking into account the constraints of the SDMA mode.

In order to achieve this, the method according to the first variant of the invention relies on a waveform of the TDMA type with time division of the channel: as shown by FIG. 3, the signal received by the base station is organized in frames, frame #1 to frame #K, each including a determined number M of bursts. Each burst, conventionally allocated to a user by virtue of the space division multiplexing, is shared by a plurality of communications, with the exception of one burst per frame, which remains allocated specifically to one mobile unit. These periodic bursts, referred to as DMA location bursts, are therefore allocated successively to all the spatio-temporal channels potentially usable on the frequency channel (the term frequency channel is intended to mean a pair of transmission/reception frequencies).

The structure of a "superframe", shown in FIG. 3, corresponds to the period for updating the spatial information of all the spatio-temporal channels, i.e. a number K of frames equal to twice the number of these channels (for each spatio-temporal channel, the spatial information is acquired on two frames: one for each of the frequencies of the frequency channel).

According to the duration of the "superframe" with respect to the invariance of the spatial information, this method needs to be adapted by, for example, allocating more than one burst per frame to the SDMA location in order to reduce the updating period.

It is clear that the choice of the number of locating bursts per frame directly affects the system capacities.

In this context, the processing synchronization consists essentially in directing the received bursts either to the spatial information measurement (burst for locating an active mobile unit), or to the space division demultiplexing (traffic burst), or nowhere (unused locating burst), and in subsequently distributing the spatial information to the multiplexing/demultiplexing filters in transmission/reception according to the channel assignments and reassignments managed by the SDMA controller 13.

FIG. 4$b$ illustrates a block diagram of the interface between the SDMA controller 13, the SDMA estimator 14 and the transmission and reception space division multiplexer/demultiplexer 10 and 7.

The bursts are directed by means of a switch 15 which, on a first input, receives the signal received by the receiver 6 (delimited by a closed dashed line) after LF transposition. On a second input, the switch also receives a control signal CTRL delivered by the SDMA controller 13. It has a first, a second and a third output, corresponding respectively to the burst for locating an active mobile unit, to the traffic burst and to the unused locating burst (inactive mobile unit).

The first output is coupled to the input of the SDMA estimator 14 which estimates the direction vector $\hat{S}_i$ of the source i corresponding to a determined active mobile unit i. The estimated direction vector $\hat{S}_i$ is put into the SDMA controller 13. The second output is inactive and the third output is coupled to the input of the space division demultiplexer 7 (delimited by a closed dashed line) consisting of the spatial filters $W_1^+$, $W_2^+$ and $W_3^+$ which respectively receive the same number N of spatial sub-channels contained in the received traffic burst. The superscript "+" corresponds to the conjugate transposition function. The outputs of the spatial filters $W_1^+$, $W_2^+$ and $W_3^+$ are coupled respectively to the input of the demodulators $8i$ DEMOD #1 to #3 (which are delimited by a closed dashed line) and deliver the information relating to the mobile units on the network of base stations represented in the figure by two parallel lines.

The reception weightings of each coefficient of the spatial filters $W_1^+$, $W_2^+$ and $W_3^+$ are updated on the basis of the direction vector $\hat{S}$ estimated by the SDMA estimator 14, after checking by the SDMA controller 13.

In transmission, the modulators $11i$, MOD #1 to MOD #3 (which are delimited by a closed dashed line) respectively receive data which are output by the base station network and are to be transmitted to the mobile units. Each modulated signal is respectively put in at the input of each transmission spatial filter $W_1$, $W_2$ and $W_3$ constituting the space division multiplexer 10 delimited by a closed dashed line.

As in reception, the transmission weighting of the coefficients of the spatial filters $W_1$, $W_2$ and $W_3$ are updated on the basis of the same direction vector $\hat{S}$ estimated by the SDMA estimator 14 and checked by the SDMA controller 13. The sub-channels respectively leaving each spatial filter $W_1$, $W_2$ and $W_3$ are added then transmitted after transposition to intermediate frequency $F_I$ in the multipath transmitter 9 delimited by a closed broken line.

The spatial filter appropriate for transmission to a determined mobile unit is calculated on the basis of its direction vector $\hat{S}$ estimated on the received signal. The need to keep the transmission and reception frequencies sufficiently far apart, in particular to allow the use of a common antenna base for the two broadcasting directions, transmission/reception, may make it impossible for the direction vectors of the sources estimated on the received signal to be used in transmission.

To solve this problem, the frequencies of a given frequency channel (transmission/reception) are permuted by the method according to the first variant of the invention, and the effect of this in the base station is an overall permutation of the sub-bands allocated to the up and down links. This permutation, carried out at the frame rate, makes it possible to estimate the spatial information on the frequency used in transmission with a frame for offset with respect to reception, which means that, in the "superframe", two consecutive locating bursts are used to make a full estimate of the spatial information on each spatio-temporal channel. A frequency permutation controller 16 is described below with reference to FIG. 8. With space division multiplexing, each channel, conventionally defined as the frequency and time support of a broadcast between a base station SB and a mobile unit, is divided into spatial sub-channels.

Figure 5:
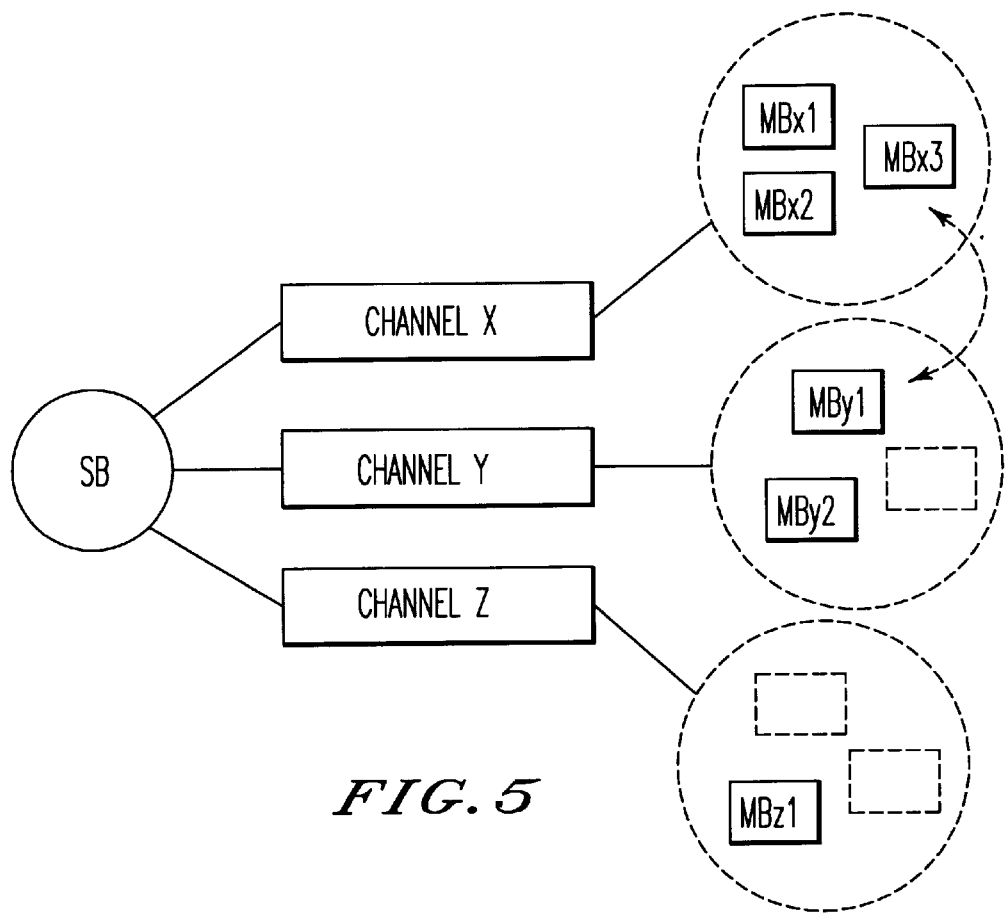
FIG. 5 depicts a scheme for the breakdown of a frequency and time channel into spatial sub-channels.

FIG. 5 illustrates a schematization of this division, where three channels X, Y and Z support the broadcasts with, respectively, three mobile units MBx1, MBx2, MBx3, two mobile units MBy1, MBy2 and one mobile unit MBz1.

Figure 6:
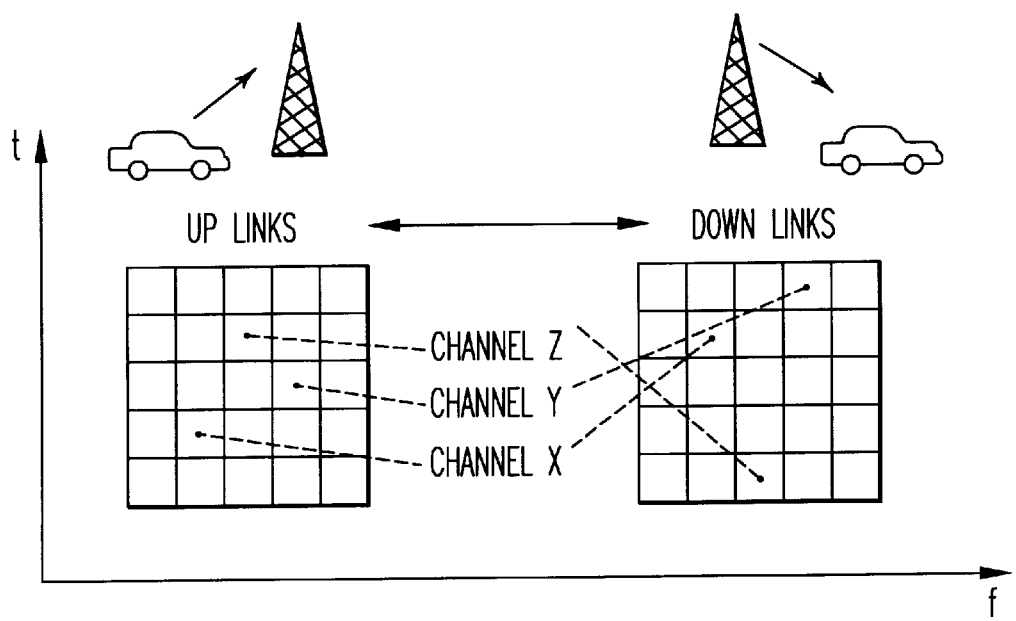
FIG. 6 depicts an illustration of the concept of a frequency and time channel.

FIG. 6 gives an illustration of the concept of a frequency and time channel for the channels X, Y, Z in the case of up links and in the case of down links.

In order to assign a channel, the method according to the first variant of the invention is based on an inter-mobile unit spatial correlation table.

Figure 7:
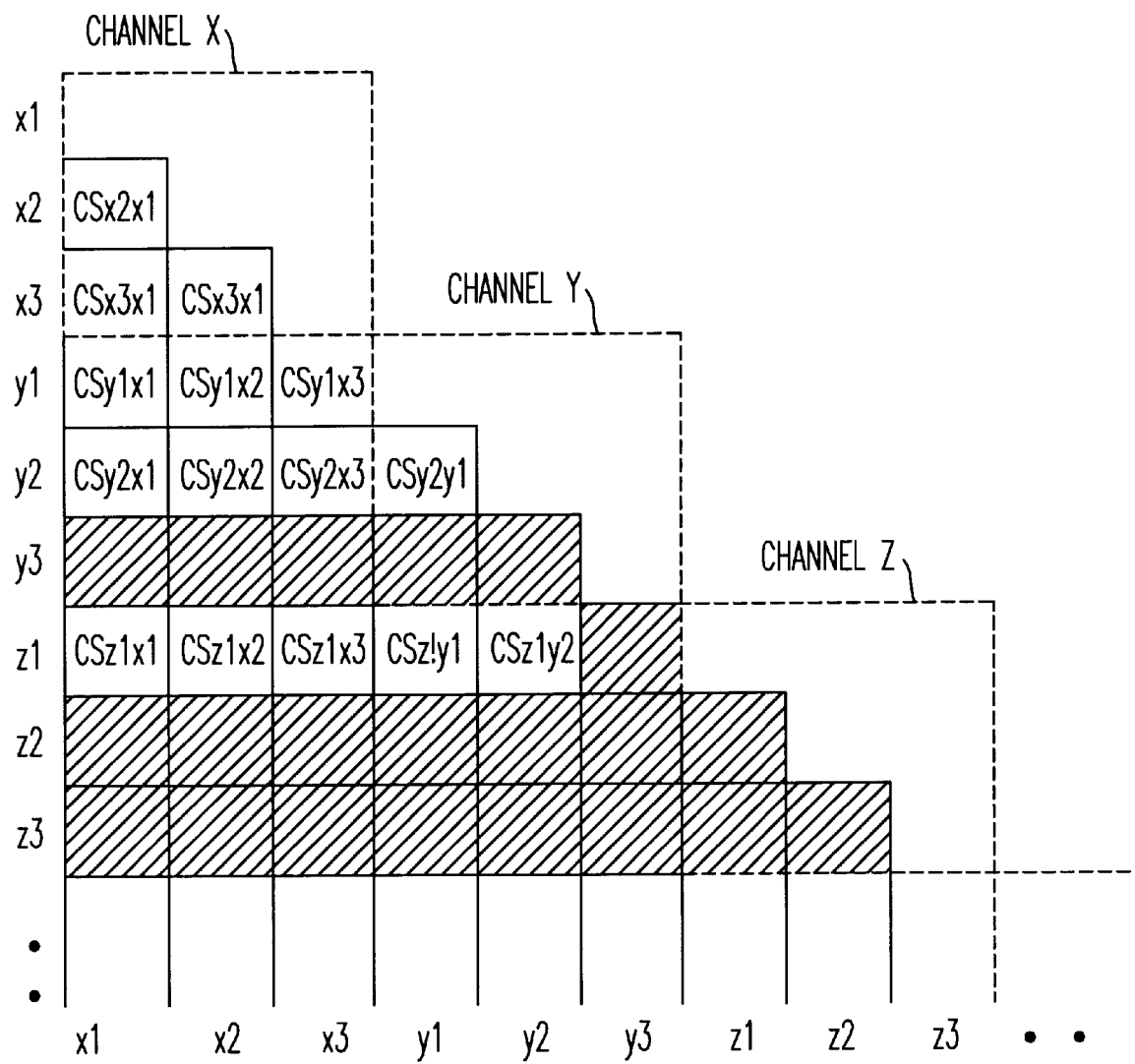
FIG. 7 depicts a spatial correlation table of the mobile units present in the cell (taken in pairs)

This table, an example of which is presented in FIG. 7, contains the spatial correlation coefficients CS of each of the mobile units with all the other ones within the fleet managed by the base station.

The spatial correlation coefficient $CS_{ij}$ between two mobile units i and j is established on the basis of their direction vectors $\hat{a}_{ib}$, $\hat{a}_{jb}$ (estimated on the low frequency $F_b$ of the channel) and $\hat{a}_{ih}$, $\hat{a}_{jh}$ (estimated on the high frequency $F_h$ of the channel) according to the formula:

$$CS_{ij} = CS_{ji} = \frac{1}{2}\left(\frac{|\hat{a}_{ib} \cdot \hat{a}_{jb}|}{\|\hat{a}_{ib}\| \cdot \|\hat{a}_{jb}\|} + \frac{|\hat{a}_{ih} \cdot \hat{a}_{jh}|}{\|\hat{a}_{ih}\| \cdot \|\hat{a}_{jh}\|}\right) \quad (1)$$

When there are multiple routes, it is the direction vector of the most powerful route associated with the transmission direction on the down link which represents the spatial information representing the mobile unit with regard to the channel assignment.

In FIG. 7, the mobile units are grouped so as to show all the spatial correlations within each channel, respectively for the X channel, the Y channel and the Z channel (zones enclosed in dashes), the values of which are more particularly taken into account in the channel assignment method.

The hatched rows and columns correspond to unused spatial sub-channels.

On each new estimation of a direction vector relating to an active mobile unit (after the analysis of each SDMA locating burst), the associated row and column in the table are updated and channel assignment tests are applied according to a determined assignment algorithm.

Its principle is as follows: the distribution of the mobile units on the various channels of the cell is updated every two frames after analysing the two locating bursts allocated to each mobile unit, successively on the two frequencies of the duplex channel.

If the last measured spatial information is associated with a mobile unit entering the cell, the SDMA controller applies the following admission test to the new mobile unit p:

in order for the mobile unit p to be admitted on the unsaturated channel Cn, it is necessary and sufficient that, for any mobile unit x already present on one of the spatial sub-channels of Cn:

$$CS_{xp} < \text{Threshold} \quad (2)$$

if this condition is not satisfied on any channel which is unsaturated (with respect to this potential capacity, that is to say the maximum number of spatial sub-channels) then the mobile unit cannot be accepted by the base station.

In the converse case, the mobile unit is admitted on the channel Cn such that:

$$\text{Max}_{x \in C_n}(CS_{px}) = \text{Min}_{i=1,2,\ldots,NoCh}[\text{Max}_{y \in C_i}(CS_{py})] \quad (3)$$

If the last measured spatial information is associated with a mobile unit p already present on the cell, then the SDMA controller starts by checking if the mobile unit remains sufficiently spatially decorrelated from the other mobile units present on the same channel, by applying the following test:

$$CS_{xp} < \text{Threshold for any mobile}$$

unit x of the channel $C_n$ \quad (4)

if this condition is satisfied, the assignment of the channels is not modified. In the converse case, the SDMA control means tests the possibility of permuting the channel refinements between the mobile unit p and a mobile unit q on a different channel $C_m$. In order for this permutation to be possible, it is necessary and sufficient for the following two conditions to be satisfied simultaneously:

$$CS_{yp} < \text{Threshold for any mobile unit y of the channel } C_m \quad (5)$$

$$CS_{qx} < \text{Threshold for any mobile unit x of the channel } C_n \quad (6)$$

If no permutation is possible, the mobile unit p can no longer be accepted by the base station.

If, and this should be the most frequent case, a plurality of permutations are possible, the proposed optimum choice criterion is as follows:

the mobile unit q adopted for carrying out the permutation with the mobile unit p is the one which minimizes the expression:

$$\sum_{\substack{x \in C_n \\ x \neq p}} CS_{xp} + \sum_{\substack{x \in C_m \\ y \neq q}} CS_{py} \quad (7)$$

where $C_m$ denotes the channel assigned to the mobile unit q.

As most techniques for spatially filtering multipath signals do not use a learning sequence, the proposed method is applicable only if the transmission and reception systems do not introduce any phase shift, differential gain or distortion (non-linear amplification).

It is very difficult and very expensive to make a device which satisfies these constraints, which is why a method is described below for using digital processing to correct the drifts and distortions on the various transmission and reception paths.

Figure 8:
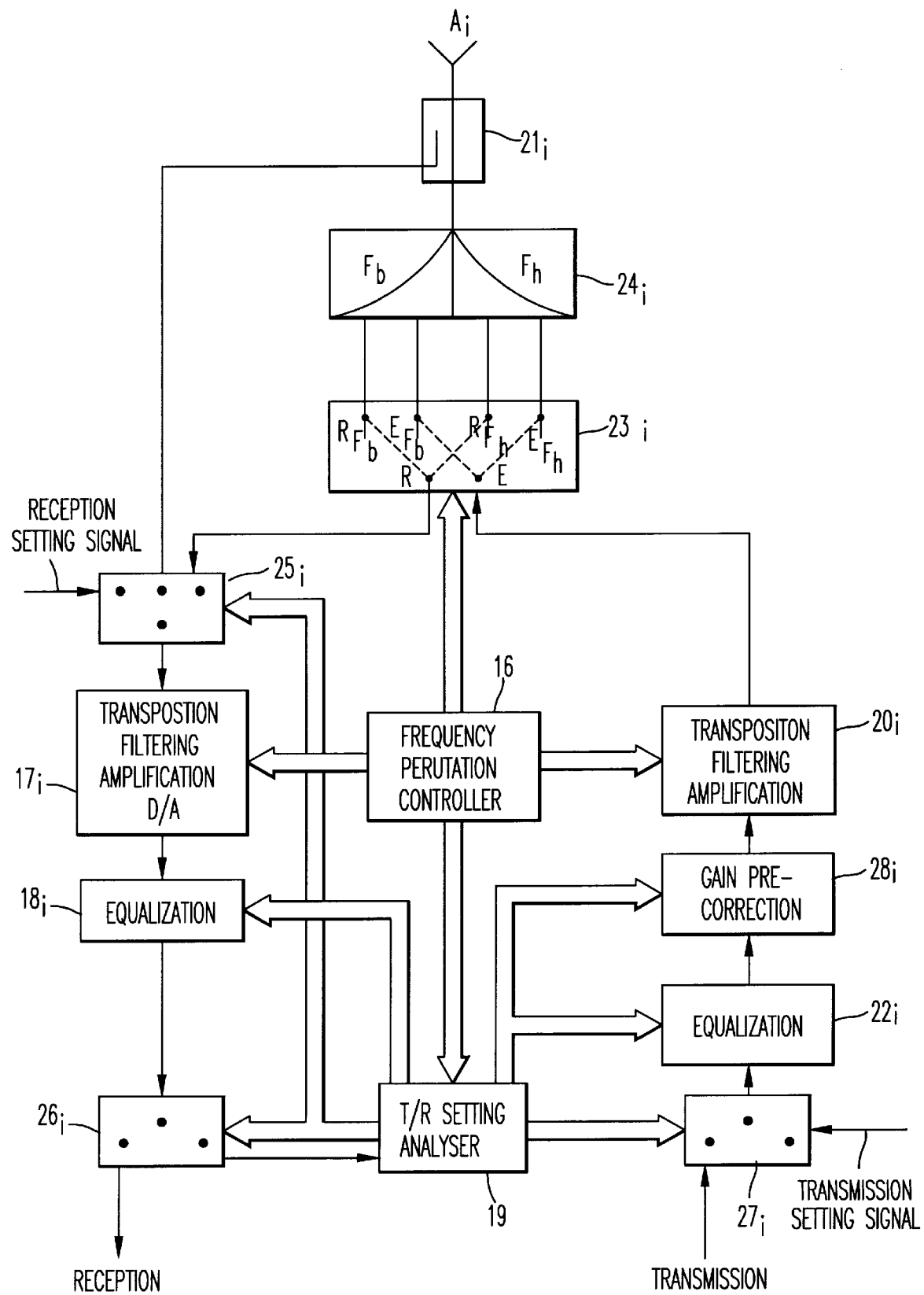
FIG. 8 depicts a block diagram of a switching and setting module of the device for implementing the method according to the invention.

The phase shifts and differential gains for each path formed by each antenna of the antenna base 4 are corrected by a setting procedure which is divided into two steps. This procedure is used by a device whose block diagram is illustrated in FIG. 8.

In a first step, the reception system 17i of each path i, including means for frequency transposition, filtering, amplification and analogue/digital conversion, is set by putting in a setting signal upstream of the reception system 17i, then adapting the coefficients of an equalizing filter 18i coupled to the output of the reception system 17i (apart from the first one which is taken as a reference) making it possible to compensate for the dispersion in the impulse responses of the various paths i, by a setting analyser 19 common to all the paths i formed by the antenna base 4.

In a second step, the transmission system 20i of each path i, including means for digital/analogue conversion, amplification, filtering and frequency transposition, is set in similar fashion, also by putting in a setting signal upstream of the transmission system 20i. Part of the transmitted signal is put back into the reception system 17i which has been set beforehand, via a resistive coupler 21i. Lastly, an equalizing filter 22i coupled to the input of the transmission system 20i is adapted according to the same principle as the reception system 17i.

This figure also depicts the frequency permutation controller 16. A two-way switch provides transmission and reception, respectively, at the low frequency $F_b$ and the high frequency $F_h$ of the received signal. These two frequencies $F_b$ and $F_h$ are separated by means of a duplexer 24i arranged between the resistive coupler 21i and the two-way switch 23i. The controller 16 for permutation of the frequencies $F_b$ and $F_h$ is coupled to the transmission and reception systems 20i and 17i of each path i, to the setting analyser 19 and to the two-way switch 23i.

A first one-way switch 25i arranged at the input of the reception system 17i receives the reception setting signal on a first input, on a second input the signal sampled by the resistive coupler 21i and on a third input the reception signal at the low frequency $F_b$ or high frequency $F_h$, depending on the position of the two-way switch 23i.

A second one-way switch 26i is coupled to the output of the reception equalizing filter 18i and controls the reception setting.

A third one-way switch 27i, arranged at the input of the transmission system 20i before the equalizing filter 22i receives, on a first input, the signal to be transmitted and, on a second input, the transmission setting signal.

The setting signal used is composed of N sine waves spaced equally in the working band.

The principle of adapting the p coefficients of the equalizing filters 22i and 18i of the transmission and reception systems 20i and 17i is based on minimizing the following criterion:

$$\|m_i' - F . w_i\|^2 \quad (8)$$

where $$m_i' = \frac{H_1}{H_i}$$

($H_i$=frequency response of channel i estimated at the frequencies of the setting signal), $F.w_i$ is the frequency response of the equalizing filter of path i, with F an N×p matrix such that $F(m,n) = e^{-2 \cdot j \cdot \pi f_m \cdot n}$, and $f_m$ one of the frequencies forming the setting signal.

The least squares solution for the equalizing filter of path i is therefore:

$$w_i = [F^+ . F]^{-1} F^+ . m_i' \quad (9)$$

The path formation in transmission as well as the independence of the sources mean that the signals to be transmitted in SDMA mode do not have a constant envelope, and that their dynamic range may exceed the linearity range of the amplifiers of the transmission systems 20i.

In order to avoid mismatched distortions between paths, a pre-correction filter 28i is arranged at the input of the transmission system 20i, the characteristics of which are as follows:

by modelling the amplitude and phase distortions of an amplifier as follows:

$$\begin{cases} \rho_{out} = f(\rho_{in}) \\ \theta_{out} = \theta_{in} + g(\rho_{in}) \end{cases} \quad (10)$$

the pre-correction functions f' and g' established after learning for the functions f and g are defined by:

$$\begin{cases} f' = G \cdot f^{-1} \\ g' = -f' \circ g \end{cases} \quad (11)$$

where G denotes a possible fixed gain of the combination of the pre-correction filter+amplifier.

The technique employed to estimate the spatial information of the mobile sources is one of the essential keys of this first variant of the invention. This highly promising technique, referred to as "blind source separation" therefore utilizes the non-gaussian and independent nature of the signals to be separated.

Blind source separation makes it possible to take into account multiple routes, which may or may not be temporally correlated, in the estimation of the direction vectors, which is not the case for the techniques conventionally applied in high-resolution goniometry or for separation techniques utilizing cyclostationarity.

The (temporally) correlated multiple routes are integrated in a single composite direction vector, while the decorrelated multiple routes are separated by the method which results in the estimation of one direction vector per independent route.

It should be recalled that the algorithm for estimating the spatial information is applied to signals in single-transmission configuration (on the locating bursts).

The processing operations are divided up as follows:

estimating the source space (associated with the temporally decorrelated multiple routes), whitening the source signals, and estimating the whitened direction vectors.

The source space is estimated via a decomposition into eigenvectors, eigenvalues (QR, Jacobi or other method) of the hermitian correlation matrix of the observations x(t):

$$R_x = E[x(t).x(t)^+] = U.D.U^+ \quad (12)$$

where $E[x(t).x(t)^+]$ corresponds to the mathematical expectancy, with U the eigenvector matrix, and D the diagonal eigenvalue matrix.

The correlation matrix of the source signals is then defined by:

$$R_s = U_s.D_s.U_s^+ \quad (13)$$

with $U_s$ the eigenvector matrix of the source space, and $D_s$ the diagonal matrix of the eigenvalues of the source space.

The source space is isolated by applying a minimum threshold to the eigenvalues.

The source whitening matrix B is written:

$$B = (R_s^{-1})^{+/2} = D_s^{-1/2}.U_s^+ \quad (14)$$

Whitening the signals then consists simply in applying the whitening matrix to the observation vector, which gives the following formula for the whitened data:

$$y = B.x = R_s^{-1})^{+/2}.x \quad (15)$$

The last step consists in estimating H, corresponding to the unitary matrix of the orthonormalized direction vectors of the sources.

There are a number of algorithms for making this estimate, of which the Comon and Cardoso-Souloumiac ones are proposed as being the most robust ones tested, consisting in solving the following optimization problem:

$$\text{setting } z = H_{mc}^+.y \quad (16)$$

as an estimator of H, Comon proposes the unitary matrix $H_{mc}$ minimizing the sum of all the squares of the moduli of the crossed cumulants of 4th order in z, which is equivalent to finding the matrix $H_{mc}$ maximizing the contrast factor defined by Comon, namely:

$$C_{com} = \sum_{i=1}^{M} |\text{Cum}(z_i(t), z_i(t)^*, z_i(t)^*, z_i(t))|^2 \quad (17)$$

(method detailed in the article by P. Comon: "Independent Component Analysis—Signal Processing", Vol. 36, No. 3, Special Issue On Higher Order Statistics, pp 287–314, April 1994).

As an estimator of H, Cardoso and Souloumiac propose the matrix $H_{mc}$ minimizing the sum of the squares of the moduli of the crossed cumulants of 4th order in z having different first and second indices, which is equivalent to finding the matrix $H_{mc}$ maximizing the function $C_{car-sou}$:

$$C_{car-sou} = \sum_{i,k,l=1}^{M} |\text{Cum}(z_i(t), z_i(t)^*, z_k(t)^*, z_l(t))|^2 \quad (18)$$

(method detailed in the article by J. F. Cardoso and A. Souloumiac "Blind Beamforming for Non Gaussian Signals", IEE Proc-F, Vol. 140, No. 6, pp 362–370, December 1993).

The final estimate of the unwhitened direction vectors Â which are used in the spatial filtering is obtained simply by applying the inverse matrix of the whitening matrix:

$$\hat{A} = B^{-1}.\hat{H} = U_s.D_s^{1/2}.\hat{H} \quad (19)$$

For the space division demultiplexing in reception, the spatial filtering consists in optimizing, for each mobile unit, the antenna diagram as a function of its spatial information, that is to say by forming lobes in the direction of the multiple routes of the mobile signal in question, and holes in the directions of the oth er mobile signals. In SDMA mode, the base station therefore applies as many spatial filters as there are active mobile units on the same channel.

Figure 4A:
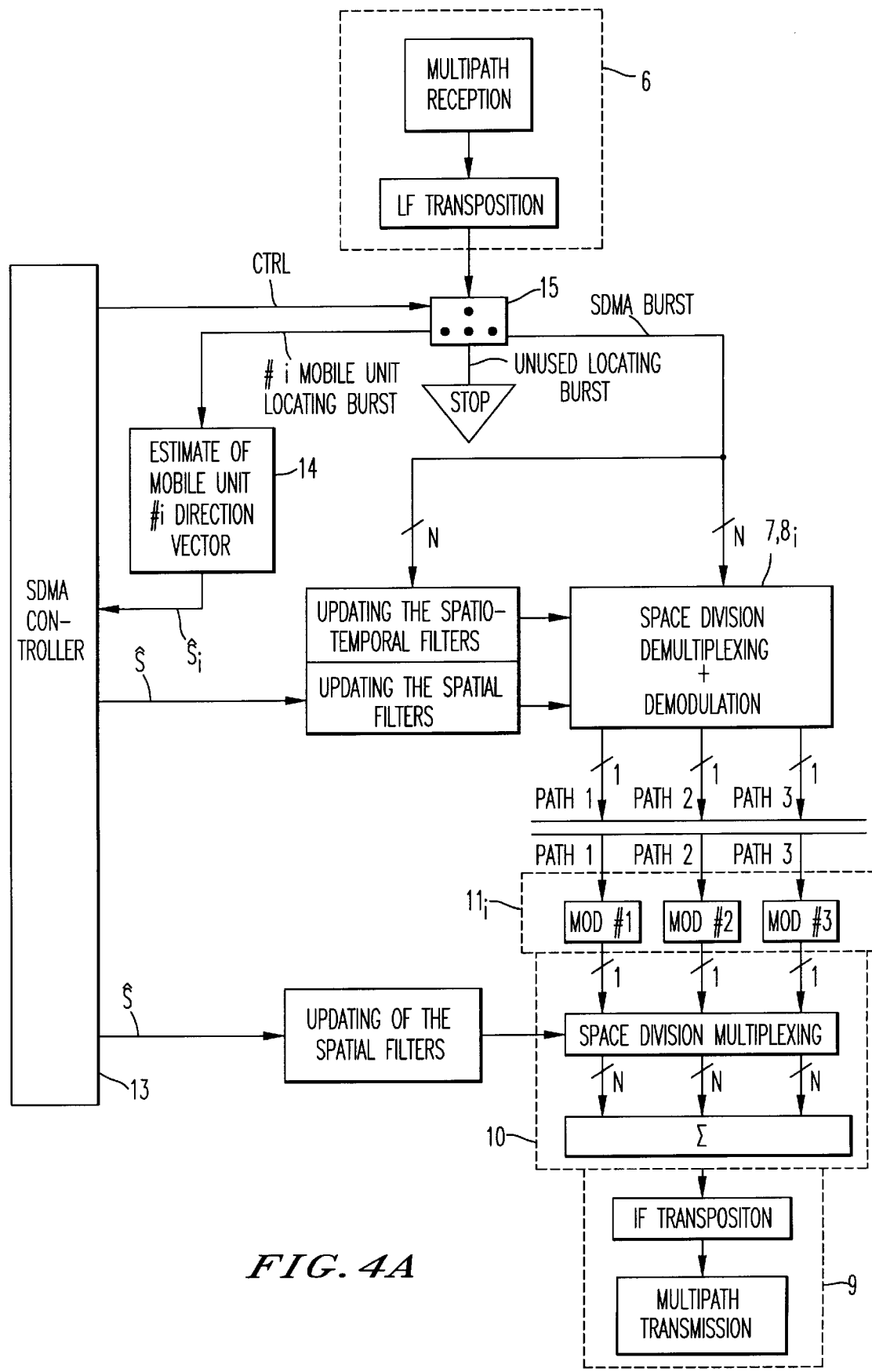
FIG. 4a depicts a block diagram specifying the interface between the SDMA controller and the means for estimation and space division multiplexing/demultiplexing, according to the second variant of the invention.
Figure 4B:
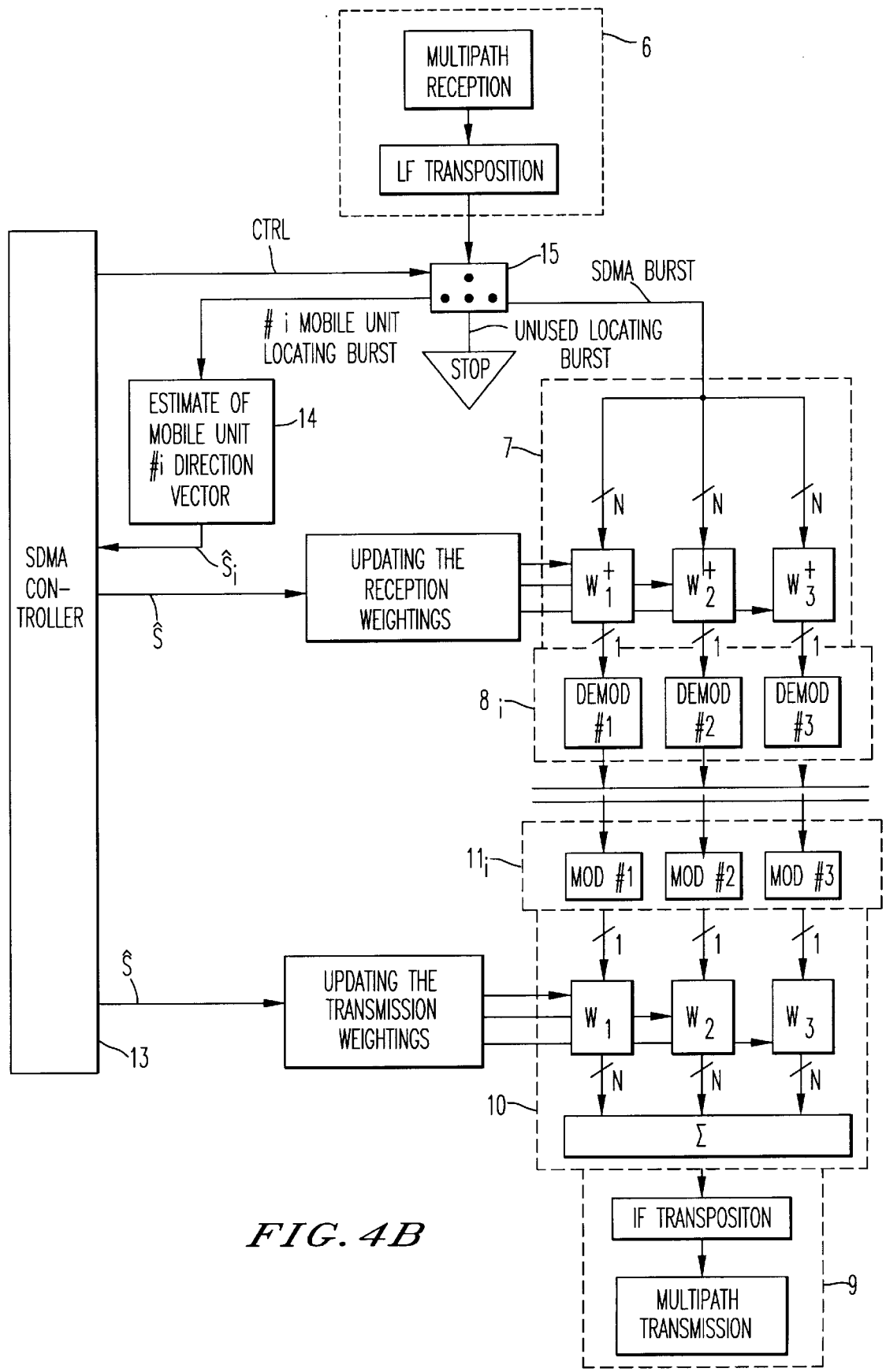
FIG. 4b depicts a block diagram specifying the interface between the SDMA controller and the means for estimation and space division multiplexing/demultiplexing, according to the first variant of the invention.

The spatial filter application illustrated in FIG. 4b can be summarized by the following formula:

$$y_i(t) = w_i^+.x(t) \quad (20)$$

where $y_i(t)$ represents the spatial filtered signal on which the contribution of the mobile unit has been amplified and that of the other mobile units strongly attenuated.

The proposed method of adapting the coefficients of the reception spatial filter is referred to as estimated adapted spatial filtering, or estimated ASF, and consists in re-activating the spatial filter adapted to the mobile unit i as a function of the estimated correlation matrix of the observations and the spatial information, according to the formula:

$$w_i = (\hat{R}_x + \sigma_i^2 \text{Id})^{-1}.\hat{a}_i \quad (21)$$

with:

$w_i$ the weighting vector adapted to the separation of the source i, $$\hat{R}_x = E[x(t) \cdot x^+(t)] = \frac{1}{n} \sum_{k/}^{n} x\left(\frac{k}{Fe}\right) \cdot x^+\left(\frac{k}{Fe}\right), \quad (22)$$

the estimate of the observation correlation matrix $$\hat{a}_i = \sum_{p=1}^{m} \Pi_{i \cdot m} \hat{a}_{im} \quad (23)$$

the composite direction vector of the mobile unit i, constructed by adding the direction vectors of the multiple routes, weighted by their relative powers, $\sigma_i^2$, the fictitious noise term added to make the estimate more robust with regard to the risks of rejecting the useful signal, these risks being due to the errors made on $\hat{a}_i$ (the addition of this noise term is not crucial for the blind source separation method, since the source vectors are directly and therefore precisely estimated on the basis of the received signals, whereas, in the case of goniometry, each direction vector is deduced from an estimate of the direction of arrival via setting tables), and Id corresponds to the identity matrix.

For the space division multiplexing in transmission, the principle of the spatial filtering is to perform the operation that is the inverse of the spatial filtering in reception, that is to say instead of separating the signals arriving on the antenna base with different azimuths, it involves using this same base to generate a composite signal in which each component addressed to a particular mobile unit propagates in the direction defined by its main direction vector.

Unlike the filtering in reception where, to optimize the signal-to-noise ratio, it is important to take into account all the multiple routes of a given source, in transmission it is preferable to focus the energy only in the direction of the most powerful received multiple route.

The application of the weightings to the signals to be transmitted which are output by the various modulators MOD #1 to #3 11i as illustrated in FIG. 4b is written as follows:

$$x = W.m \quad (24)$$

with:
m=(m$_1$(t), m$_2$(t), . . . m$_M$(t)) the signals output by the M modulators,
x=(x$_1$(t), x$_2$(t), . . . , x$_N$(t)) the signals transmitted on the N antennas,
W the matrix of the vectors w$_i$(i=1 to M).

The method of adapting the coefficients of the spatial filter in reception is theoretically applicable in transmission, but because of the residual setting errors of the paths in transmission and reception, so-called "copy" errors are made which cause aiming errors with poor positioning of the "holes" in the radiation diagram and the risk, during reception by the mobile unit, of a poor signal/interference-source ratio without the possibility of rejection.

This is why the adaptation in transmission is carried out using a slightly different technique, referred to as synthetic ASF.

w$_i$, the spatial filter in transmission adapted to the mobile unit i, is calculated by applying to its main direction vector (associated with the most powerful multiple route) the inverse not of the estimated correlation matrix of the observations on the N antennas, but of a synthetic correlation matrix of the interfering signals R$_{Ji}$:

$$w_i = R_{Ji}^{-1} \cdot \hat{a}_i \quad (25)$$

This matrix is constructed on the basis of the direction vectors of two fictitious interference sources placed on either side (in azimuth) of each real interference source (each mobile unit constituting an interference source for all the others). The benefit of this method is that it allows a slight error on the direction vectors of the interference sources, by widening the "holes" of the radiation diagram around their estimated directions.

The synthetic correlation matrix used to estimate the weighting vector w$_i$ (focusing in the direction of the mobile unit i) is written in the form:

$$R_{Ji} = \sum_{j \neq i} \Pi_j \cdot \sum_{\substack{k=-1 \\ k \neq 0}}^{+1} a_{jk} \cdot a_{jk}^+ + \sigma_2^j \cdot Id \quad (26)$$

with:
a$_{jk}$ representing the direction vectors of the two fictitious interference sources:

$$a_{jk} = \hat{a}_j(\theta + k \cdot \Delta\theta) \quad (27)$$

In the absence of information relating to the azimuth of the source θ and relating to the variation of a direction vector with the azimuth of its source (without a setting table), these vectors are obtained by phase-shifting the estimated direction vector $\hat{a}_j(\theta)$:

$$\hat{a}_{jk} = D_k \cdot \hat{a}_j(\theta) \quad (28)$$

with D$_k$ the diagonal phase-shift matrix whose diagonal coefficients are of the form:

$$d_k(i) = e^{j \cdot k \cdot (i - N) \cdot \Delta\phi} \quad (29)$$

where:
Δφ is a phase shift of the order of a few degrees, to be adapted as a function of the antenna base 4,
π$_j$ denotes the power of the source j considered as the interference source in this case, this parameter being fixed at a value proportional to the depth of the "hole" which needs to be formed in the direction of the mobile unit j on the radiation diagram (typically 30 dB above the useful signal).
σ$^{j2}$ is a noise term added to adjust the depth of the "hole" in the radiation diagram, and its addition also makes the matrix R$_{Ji}$ invertible and obviates an expensive pseudo-inverse matrix calculation.

According to the second variant of the invention, a number of operations described above, in the first variant of the invention, are carried out differently and are described below. These are the operations:
of estimating the spatial information relating to each mobile unit, this being done by methods of utilizing sequences known a priori
of isolating and demodulating the received signal of each of the mobile units in contact with the base station in order to make the space division demultiplexing possible.

The method according to the second variant of the invention is illustrated in FIG. 1, as in the case of the first variant of the invention. On the basis of a multipath transmission/ reception 1, the method consists in estimating 2 the spatial information relating to each active mobile source present in the cell at the two frequencies supporting the transmission and the reception alternately, then on the basis of this information in performing optimum overall multiplexing/demultiplexing 3 (time division, frequency division and space division) of the communications.

The general principle of the second variant of the invention is as follows: the spatial information is estimated for each mobile source present in the cell at the two frequencies of the channel which support the transmission and the reception alternately, on the basis of a received signal. This spatial information is then used to adapt the coefficients of the spatial filtering structure in transmission. As regards the space division demultiplexing and demodulation part, a number of variants are proposed by the second variant of the present invention:

- a structure of the ASF-DFE type (ASF standing for Adaptive Spatial Filtering, and DFE standing for Decision Feedback Equalizer), combining a purely spatial filter (one complex coefficient per path) and a decision component;
- a structure of the ASTF-TWN-DFE type (ASTF standing for Adapted Spatio-Temporal Filter, TWN standing for Time-domain White Noise, and DFE standing for Decision Feedback Equalizer), consisting of a spatio-temporal filter associated with an independent decision component;
- a structure referred to as ASTF-DFE, consisting of a spatio-temporal filter coupled to a decision component.

Whereas the first structure (ASF-DFE) uses the information estimated beforehand, or alternatively the learning sequence directly, in order to adapt, the adaptation of the spatio-temporal filters used in the last two structures (ASTF-TWN-DFE and ASTF-DFE) directly uses the known waveform learning sequences.

The spatial information characterizing a mobile unit is defined by the direction vectors of the multiple routes of the signal received on the antenna base.

These direction vectors represent the response (amplitude and phase) of the antenna base to a signal incident with an azimuth characteristic of the position of the source.

The estimation 2 of the direction vectors of each source uses signals received from the source of interest in single-transmission configuration. In other words, in the waveform, a periodic time range referred to hereafter as a burst is allocated to each mobile unit for updating its spatial information. The method applied for this estimation 2 utilizes the sequences known a priori and operates perfectly when there is no setting of the antenna base. However, in view of the generally large difference between the frequencies of the up (mobile units to base station) and down (base station to mobile units) links, the estimate which is made on the signals which are received and is used for spatial filtering in reception cannot be transposed for the spatial filtering in transmission. This is why, in the method according to the first variant of the invention, the groups of frequencies of the up and down links may be permuted periodically so as to make it possible to learn and update the spatial information at the transmission frequencies as well.

Most base stations manage a plurality of time/frequency channels in duplex mode, and in this context the method according to the first variant of the invention may make it possible to carry out overall management of these channels, within which the space division multiplexing generates SDMA sub-channels, so as to group the most spatially decorrelated mobile units preferentially on the same time/frequency channel.

For each mobile unit, the estimated spatial information includes one or more direction vectors associated with the various detected routes, as well as the relative power of each of the routes. On the basis of these data relating to all the mobile units whose broadcasts are multiplexed together, a spatial filter is calculated in transmission for each link with the constraint of focusing the radiation diagram in the direction of the main route of the useful signal, and conversely to make a hole in the radiation diagram in the direction of the main route of each of the interference signals (due to the broadcasts with the other mobile units). The signals are formed by adding the outputs of the space division multiplexing filters path by path.

Depending on the variants employed in the second variant of the invention, the space division demultiplexing/demodulation assembly makes it possible:

- ASF-DFE: to take into account the main useful route and reject the main interference routes and the other useful routes spatially decorrelated with the main route, so far as the structure is able (a structure with N sensors can reject N−1 signals spatially decorrelated with the useful signal),
- ASTF-TWN-DFE: to rephase the energy of all the routes of the useful signal and to reject sub-optimally the multi-route interference signals. Although this method provides a gain in terms of the signal-to-noise ratio on the current symbol in comparison with ASF-DFE, it has the same capacity for rejecting the interference signals, apart from the fact that the useful multiple routes other than the main route are no longer likened to interference signals, which frees that many degrees of freedom to take into account other interference sources,
- ASTF-DFE: to process quasi-optimally a multisensor signal suffering interference, by not only rephasing the multiple routes of the useful signal but also rephasing the multiple routes of the interference signals before they are rejected. This method makes it possible, in order to eliminate an interference source, to use only a single spatial degree of freedom irrespective of the number of multiple routes along which this source is received at the multisensor array.

Furthermore, the method according to the second variant of the invention updates the coefficients of the spatial filters in reception and transmission, respectively performing space division demultiplexing and space division multiplexing while taking into account the pairing errors due to residual setting errors of the paths in transmission and reception.

A device for implementing the method according to the second variant of the invention is schematized by FIG. 2, as in the case of the first variant of the invention, and includes the same sub-assemblies. However, there is a difference in the description of the second variant, in that the space division demultiplexer 7 includes a determined number of spatial or spatio-temporal filters, coupled to a determined number of demodulaters 8$i$ equal to the maximum number of spatial channels fixed per frequency channel, for example three demodulators for a base having ten antennas.

The second variant uses the same "superframe" concept illustrated in FIG. 3 and described above.

The interface between the SDMA controller 13, the SDMA estimator 14 and the transmission and reception space division multiplexer/demultiplexer 10 and 7 is illustrated not by FIG. 4b but by FIG. 4a.

According to this FIG. 4a, the bursts are directed by means of a switch 15 which, on a first input, receives the signal received by the receiver 6 delimited by a closed dashed line, after LF transposition. On a second input, the switch 15 also receives a control signal CTRL delivered by the SDMA controller 13. It has a first, a second and a third output corresponding respectively to the burst for locating an active mobile unit, the traffic burst and the unused locating burst (inactive mobile unit).

The first output is coupled to the input of the SDMA estimator 14 estimating the direction vector $\hat{S}_i$ of the source i corresponding to a determined active mobile unit i. The estimated direction vector $\hat{S}_i$ is put into the SDMA controller 13. The second output is inactive and the third output is coupled to the input of the space division demultiplexer/demodulators 7 and 8$i$. The third output is also used to update the spatio-temporal filters. The demultiplexer/demodulator 7 and 8$i$ includes N spatial or spatio-temporal filters (not shown) respectively receiving the same number N of spatial sub-channels contained in the received traffic burst. The outputs of the spatial or spatio-temporal filters are coupled respectively to the input of the demodulators 8$i$ and deliver data relating to the mobile units on the base station network represented in the figure by two parallel lines.

The reception weightings of each coefficient of the spatial or spatio-temporal filters are updated on the basis of the direction vector $\hat{S}$ estimated by the SDMA estimator 14 and after checking by the SDMA controller 13.

In transmission, modulators 11$i$ MOD #1 to MOD #3, delimited by a closed dashed line, respectively receive data which are received from the base station network and are intended to be transmitted to the mobile units. Each modulated item of information is put respectively into the input of each transmission spatial filter (not shown) of the space division multiplexer 10 delimited by a closed dashed line.

In the same way as in reception, the transmission weighting of the spatial filter coefficients is updated on the basis of the same direction vector $\hat{S}$ estimated by the SDMA estimator 14 and checked by the SDMA controller 13. The sub-channels respectively leaving each spatial filter are added then transmitted after transposition to intermediate frequency $F_I$ in the multipath transmitter 9 delimited by a closed dashed line.

The spatial filter adapted for transmission to a mobile unit is calculated on the basis of its direction vector $\hat{S}$ estimated on the received signal. The need to keep the transmission and reception frequencies far enough apart to allow the use of a common antenna base for the two transmission/reception broadcasting directions may make it impossible to use in transmission the direction vectors of the sources estimated on the received signal.

In order to solve this problem, the frequencies of a given frequency channel (transmission/reception) are permuted by the method according to the second variant of the invention, with the effect in the base station of overall permutation of the sub-bands allocated to the up and down links. This permutation, carried out at the frame rate, makes it possible to estimate the spatial information on the frequency used in transmission with a frame for offset with respect to the reception, which means that, in the "superframe", two consecutive locating bursts are used to make a full estimate of the spatial information on each spatio-temporal channel. A permutation controller 16 for the frequencies controls the frequency permutation as described above with reference to FIG. 8.

With the space division multiplexing, each channel, conventionally defined as the frequency and time support of a broadcast between a base station SB and a mobile unit, is divided into spatial sub-channels.

FIG. 5 illustrates a schematization of this division according to the second variant of the invention, in the same way as according to the first variant of the invention.

FIG. 6 gives an illustration of the concept of a frequency and time channel according to the second variant of the invention, in the same way as according to the first variant of the invention.

The channel assignment of the method according to the second variant of the invention is based on an inter-mobile unit spatial correlation table, an example of which is presented in FIG. 7 in the same way as according to the first variant of the invention.

FIG. 8 provides a block diagram of a switching and setting module of the device for implementing the method according to the second variant of the invention. The description in FIG. 8 is the same as the one given for the first variant of the invention.

A device for implementing the method according to the second variant of the invention, schematized in FIG. 2, employs a synchronization method specific to this variant.

The synchronization of the receiver on one of the broadcasting paths during the traffic phases (SDMA traffic bursts) is carried out in an environment affected by interference (all mobile units sharing the same time/frequency channel transmit simultaneously during the traffic bursts).

These reception conditions require the use of a more high-performance synchronization method than the conventional single-sensor synchronization (threshold detector at the filtering output, adapted to the learning sequence) which in this context is ineffective.

The synchronization method according to the second variant of the invention has formed the subject-matter of a French patent filed by the applicant company and published under the U.S. Pat. No. 2,715,588, entitled: "Procédé et dispositif permettant á un modem de se synchroniser sur un transmetteur de données numériques par voie hertzienne en présence de brouilleur" ["Method and device making it possible for a modem to synchronize with a digital data radio transmitter in the presence of an interference source"]. It is implemented by an optimum multisensor tector in the following conditions:

gaussian total noise (background noise+interference sources), circular (rotationally invariant) total noise, time domain white total noise (constant in the band, not multi-route).

The purpose of this detector is, for each ample, to decide between two possible cases:

H0:x(t)=b(t) (just noise)

H1:x(t)=d(t−τ$_0$)*c(t)+b(t) (noise+signal)     (30)

with c(t) denoting the multipath channel supporting the transmission, d(t) the transmitted signal and b(t) the total noise of correlation matrix R.

The optimum detector, in the sense of maximizing the detection probability for a determined false alarm probability, corresponds to the ratio of likelihoods under H1 and H0 on the time interval [n$_0$T$_e$,(n$_0$+K$_e$)T$_e$] (T$_e$ sampling period) i.e.:

$$\Lambda(x(n_0+k)),\ 1 \le k \le K_e = \frac{p(x(n_0+k),\ 1 \le k \le K_e/H1)}{p(x(n_0+k),\ 1 \le k \le K_e/H0)} \quad (31)$$

where p(x/H0), p(x/H1) respectively denote the probability density of observation under H0 and H1.

Development of this analytic expression, under the assumptions defined above regarding the total noise, leads to the following expression which is a function of x, c, b and R:

$$\hat{\Lambda}(x) = \left(\frac{det(\hat{R}_0)}{det(\hat{R}_1)}\right)^{K_e} \frac{e^{-\sum_{k=1}^{K_e}[x(n_0+k)-d(k)C]^+ R_1^{-1}[x(n_0+k)-d(k)C]}}{e^{-\sum_{k=1}^{K_e}[x(n_0+k)]^+ R_0^{-1}[x(n_0+k)]}} \quad (32)$$

A satisfactory statistical way of solving the problem in question consists in subjecting the following estimate to a determined threshold η:

$$\frac{\hat{r}_{xd}(n_0)^+ \hat{R}_x^{-1}(n_0)\hat{r}_{xd}(n_0)}{\frac{1}{K_e}\sum_{k=1}^{K_e} |d_k|^2} \leq \eta \quad (33)$$

with:

$$\hat{R}_x(n_0) = \frac{1}{K_e}\sum_{k=1}^{K_e} x(k+n_0)x(k+n_0)^+ \text{ and} \quad (34)$$

$$\hat{r}_{xd}(n_0) = \frac{1}{K_e}\sum_{k=1}^{K_e} x(k+n_0)\,d(k)^* \quad (35)$$

The spatial information characterizing the position of each mobile unit constitutes an essential parameter for adapting the transmission path formation filters. It is therefore defined for each of the mobile units by the source vector associated with the main arrival of energy on the antenna base.

This information is estimated on bursts allocated specifically and successively to each mobile unit, and therefore in single-transmission configuration (no interference).

For most cellular radio-communication systems, the standard channel models defining standard propagation conditions involve a discrete impulse response corresponding to a certain number of routes. Consequently, to estimate the spatial information, the following model of the signal received by the antenna base is used:

$$x(t) = \sum_{i=1}^{P} m(t-t_i)\,a_i + b(t) \quad (36)$$

where: $x(t)=[x_1(t), x_2(t), \ldots, x_N(t)]^T$, denotes the signal observed by the antenna base, the exponent "T" defining the transposition operation, m(t) denotes the transmitted signal, P denotes the number of temporally decorrelated discrete routes representing the impulse response of the channel, $a_i$ denotes the direction vector associated with route #i, more precisely ai integrates the product of two components:
  the response of the antenna base to an incident wavefront with azimuth θ and elevation φ (vector with N complex coefficients),
  the response of the channel to the delay $t_i$ associated with route #$_i$ (complex coefficient), (the source vectors being defined to within a complex coefficient, in the rest of the description the two components are most often combined in the source vector concept), $b(t)=[b_1(t), b_2(t), \ldots, b_N(t)]^T$ denotes the Gaussian white noise component on the N sensors. The principle of the estimation of the source vectors consists in extracting the outputs of a multisensor frame synchronization module. This module consists of N single-sensor correlators which, on each path, carry out filtering adapted to the learning sequence. In matrix notation, this processing is written:

$$y(t)=x(t)*d^*(-t) \quad (37)$$

i.e. for a sampled signal:

$$y(n) = \hat{r}_{xd}(n) = \frac{1}{L}\sum_{k=1}^{L} x(n+k)d^*(k) \quad (38)$$

with $$y(k) = \left[y_1\left(\frac{k}{F_e}\right),\, y_2\left(\frac{k}{F_e}\right),\, \ldots,\, y_n\left(\frac{k}{F_e}\right)\right],$$

the vector consisting of the N outputs of the correlators,
d=[d(0), d(1), . . . , d(L-1), d(L-2], the learning sequence, and
$x(t)=[x_1(t), x_2(t), \ldots, x_N(t)]$, the signal observed on the N sensors.

The direction vector of the main route of the useful signal is therefore estimated by the output of the N correlators at the frame synchronization time (maximum of the estimator of the multisensor detection function) i.e.:

$$\hat{a}_i = y(t_i) \quad (39)$$

with $$t_i = \frac{k_i}{F_e}$$

the delay of the route (composite or not composite) #i corresponding to the main peak detected on the detection function employed by the multisensor synchronization process.

There are other possible alternatives to this method of estimating the spatial information, which are compatible with the method relating to the second variant of the present invention, namely:
  estimation by higher-order blind source separation with a field of application limited to non-gaussian signals,
  high-resolution goniometry (with the additional constraint of providing a calibrated antenna base).

The reception demultiplexing/demodulation step of the method according to the second variant of the invention is different from the reception demultiplexer/demodulation step of the method according to the first variant of the invention and consists, using an antenna base coupled to a multipath receiver and using a digital signal processing unit, in separating then demodulating the various components of the received signal, which are associated with the mobile stations transmitting simultaneously and on the same frequency to the base station.

A number of methods allowing demultiplexing followed by demodulation in reception according to the second variant of the invention are described below, together with a filter structure adapted to each method.

These methods can be implemented on the basis of two types of filtering: spatial filtering or spatio-temporal filtering.

They all involve two identical consecutive digital processing operations, namely:

multipath spatial or spatio-temporal filtering, separating the various components of the signal which are associated with the various active mobile units and optimizing the signal/noise ratio on the current symbol, and multipath equalization/demodulation, suppressing the intersymbol interference and making the decision.

A fact common to all of them is that they utilize the a priori knowledge of learning sequences contained in the frames of the transmitted signal in order to adapt the coefficients of the filters employed.

Three structures, already introduced above and reiterated below, allow these methods to be implemented.

Figure 9:
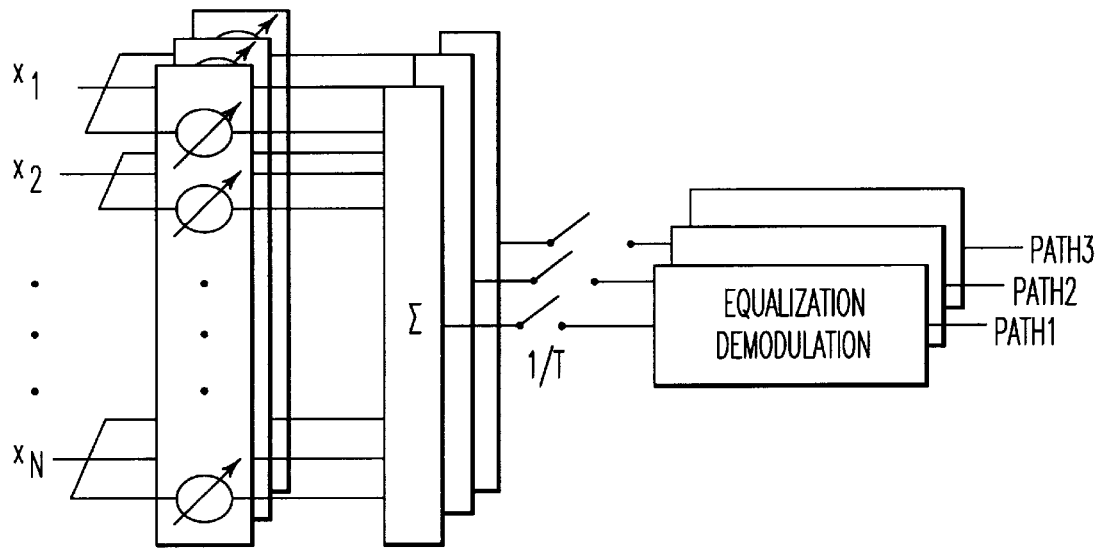
FIG. 9 depicts a structure with a multisensor spatial filter+single-sensor equalizer/demodulator, according to the second variant of the invention.
Figure 10:
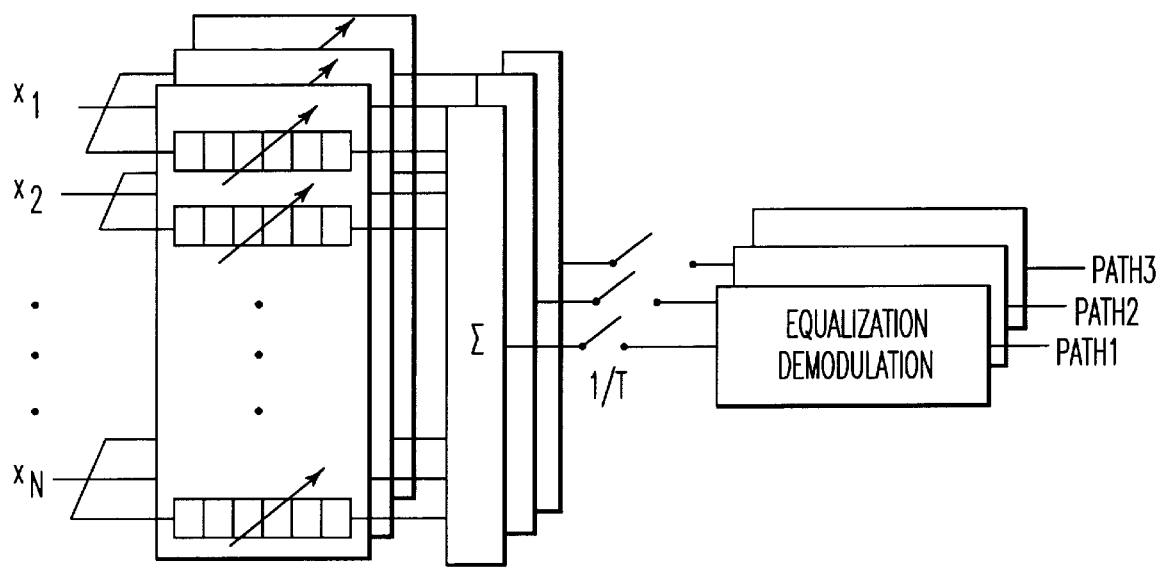
FIG. 10 depicts general structure.
Figure 11:
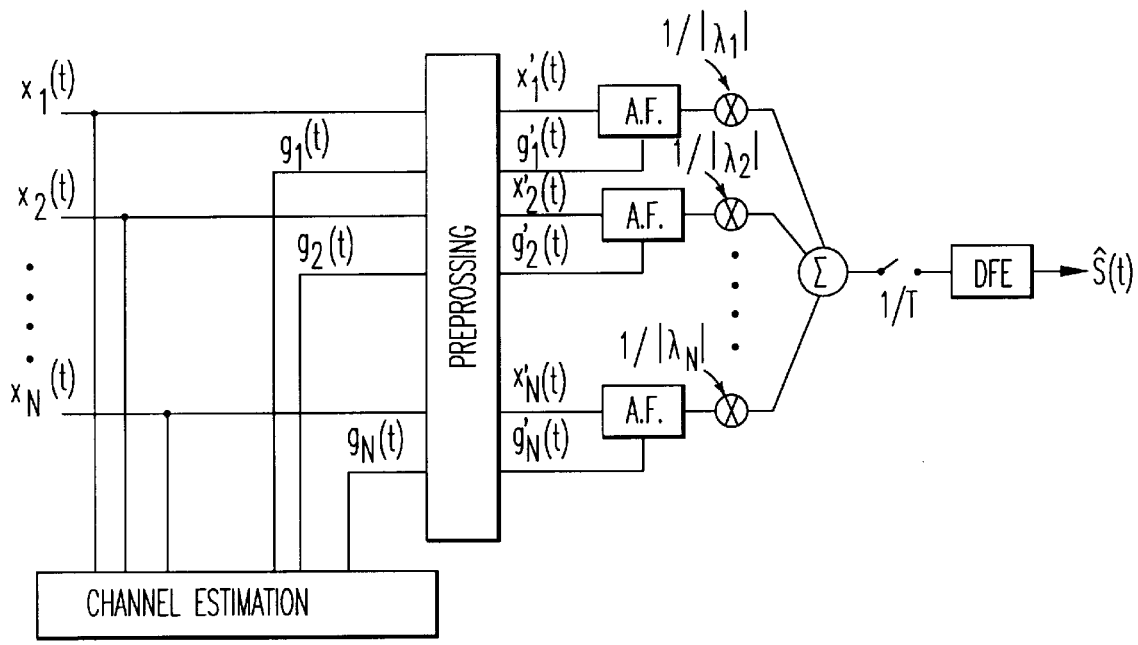
FIG. 11 depicts a first embodiment corresponding to a transmission path of the general structure in FIG. 10, entitled ASTF-TWN-DFE, according to the second variant of the invention.
Figure 12:
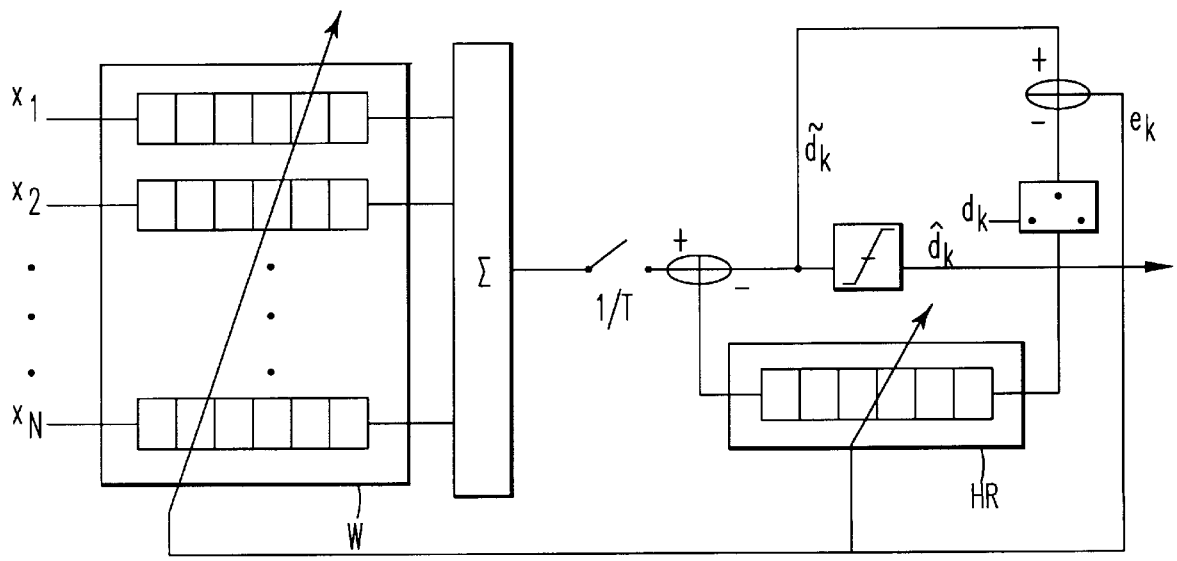
FIG. 12 depicts a second embodiment of the general structure in FIG. 10, referred to as ASTF-DFE, according to the second variant of the invention.

A first, ASF-DFE structure, illustrated in FIG. 9, applies to the spatial filtering associated with an equalization/demodulation module of DFE type, comprising two variants:

"estimated" ASF-DFE, with adaptation of the spatial filter to the direction vector of the source of interest, and "replica" ASF-DFE, with adaptation of the spatial filter directly to the reference sequence (replica);

a second and a third structure, a general structure of which is illustrated in FIG. 10, apply to the spatio-temporal filtering associated with an equalization/demodulation module of DFE type, and respectively include:

an ASTF-TWN-DFE, illustrated in FIG. 11, with uncoupled structure and carrying out the antiscrambling and equalization/demodulation processing operations, the use of which is optimal when the total noise (background noise plus interference source) is white in the time domain, and an ASTF-DFE, illustrated in FIG. 12, which jointly carries out the spatial filtering processing and the equalization/demodulation function.

These various methods and structures for implementing them are described below.

As regards ASF-DFE, the purely spatial filtering consists, for each mobile unit, in optimizing the antenna diagram as a function of its spatial information directly on the basis of the reference sequence of the useful signal, that is to say by forming lobes in the direction of the multiple routes of the mobile signal in question, and holes in the directions of the other mobile signals. In SDMA mode, the base station therefore applies a number of spatial filters equal to the number of active mobile units on the same channel.

The application of the spatial filter illustrated in FIG. 9 can be summarized by the following formula:

$$y_i(t) = w_i^+ \cdot x(t) \quad (40)$$

where $y_i(t)$ represents the spatially filtered signal on which the contribution of the mobile unit has been amplified and that of the other mobile units greatly attenuated.

This filtering method makes it possible to reject N−1 interference sources (the decorrelated multiple routes originating from a given interference source represent the number of interference sources to be taken into account). When there are multiple routes for the useful signal, this method is not optimal because it does not make it possible to rephase the routes on the various routes before they are added. On the other hand, it does not require a large processing capacity in order to be used.

The two proposed variants for adapting the coefficients of the reception spatial filter, which are referred to as "estimated" adapted spatial filtering or "estimated" ASF, and "replica" adapted spatial filtering, consists in updating the spatial filter to isolate the signal of the mobile unit i, according to the formula:

for "estimated" ASF:

$$w_i = (\hat{R}_x + \sigma_i^2 1)^{-1} \cdot \hat{a}_i \quad (41)$$

for "replica" ASF:

$$w_i = (\hat{R}_x + \sigma_i^2 1)^{-1} \cdot \hat{r}_{xd} \quad (42)$$

with:

$w_i$ the weighting vector applied to the separation of the source i, $$\hat{R}_x = E[x(t) \cdot x^+(t)] = \frac{1}{n} \sum_{k=1}^{n} x\left(\frac{k}{F_e}\right) \cdot x^+\left(\frac{k}{F_e}\right), \quad (43)$$

the estimate of the observation correlation matrix, $$\hat{a}_i = \sum_{p=1}^{m} \Pi_{im} \hat{a}_{im} \quad (44)$$

the composite direction vector of the mobile unit i, constructed by adding the direction vectors of the multiple routes, weighted by their relative powers, $\sigma_i^2$, the fictitious noise term added to make the estimate more robust with regard to the risks of rejecting the useful signal, these risks being due to the errors made on $\hat{a}_i$ (the addition of this noise term is not crucial for the blind source separation method, since the source vectors are directly and therefore precisely estimated on the basis of the received signals, whereas in the case of goniometry, each direction vector is deduced from an estimate of the direction of arrival via setting tables), and $$\hat{r}_{xd}(n) = \frac{1}{L} \sum_{k=1}^{L} x(n+k) d^*(k) \quad (45)$$

As regards the second structure, relating to the implementation of the ASTF-TWN-DFE method, the general problem of replica adaptation of a spatio-temporal filtering structure for a multi-sensor signal is theoretically defined as follows:

let the received signal be modelled by $$x(t) = G(t) * s(t) + b(t) \quad (46)$$

where: $x(t) = [x_1(t), x_2(t), \ldots, x_N(t)]^T$ denotes the signal received on the antenna base $G(t) = [g_1(t), g_2(t), \ldots, g_N(t)]^T$, the modelling of the channel on the N sensors, $s(t)$ the transmitted signal, and $b(t) = [b_1(t), b_2(t), \ldots, b_N(t)]^T$, the noise+interference source component on the N sensors.

The problem in question consists in estimating the coefficients of the filter W of the spatio-temporal structure performing an optimum filtering adapted to the multi-sensor signal.

The theoretical formulation of this filter is as follows:

$$W(t) = R_b^{-1}(t) * G(t) \quad (47)$$

with $R_b(t) = E[b(t_0), b^+(t_0-t)]$ the correlation matrix of the noise+interference source component.

This expression is not simple to estimate in the general case also the first proposed adaptation method (ASTF-TWN) has the restrictive assumption of time-domain white noise, which is essentially equivalent to the following assumptions regarding the interference signals:

the interference signals are wide-band (≧useful signal band), the interference signals are single-route.

The problem to be solved is thus simplified by the form which the correlation matrix $R_b$ takes.

$R_b(t) = R_b \delta(t)$ with $R_b$ a constant. ($\delta(t)$ corresponds to the Dirac function)

When considering the frequency domain, W is written:

$$W(f) = R_b^{-1} G(f) \tag{48}$$

$R_b$ no longer depends on f, and the problem reduces to separate estimations of G and of $R_b$.

The estimation of the channel G consists in N independent channel estimates on a single-sensor signal.

Let g be one of the channels to be estimated, then the single-sensor modelling of the associated signal x(t) received at the frame synchronization time and sampled twice per symbol, is as follows:

$$x(k) = g^T s(k) + b(k) \tag{49}$$

where:

$s(k) = [s(kT_e), s((k-1)T_e), \ldots, s(k-(L-1)T_e)]$ denotes the samples of the known or replica learning sequence, and b(k) the sample of the noise+interference source component.

This equation, in which the unknown is g, is generally solved by methods minimizing the mean square error MSE defined by:

$$\xi = E[\|x(k) - h^+ s(k)\|^2] \text{ with } g = h^* \tag{50}$$

whose theoretical solution is defined by:

$$h = R_{ss}^{-1} r_{sx} \tag{51}$$

with $R_{ss} = E[s(t)s^+(t)]$, an unbiased estimate of which is given by:

$$\hat{R}_{ss} = \frac{1}{(M-L)} \sum_{n=L+1}^{M} s(k)s(k)^+ \tag{52}$$

and $r_{sx} = E[s(t)x^*(t)]$, an unbiased estimate of which is given by:

$$\hat{r}_{sx} = \frac{1}{(M-L)} \sum_{n=L+1}^{M} s(k) \times^* (k) \tag{53}$$

In practice, $R_{ss}$ depends exclusively on the a priori known learning sequence, and the matrix $R_{ss}^{-1}$ may be precalculated.

The estimation of the correlation matrix of the noise+interference source component $R_b$ is based on knowledge of the learning sequence and of the channel on the N sensors (matrix G).

On the basis of the above modelling of the multisensor signal, the following expression of the estimate of the noise+interference source component on path n is derived:

$$b_n(t) = x_n(t) - g_n(t) * s(t) \tag{54}$$

whence the expression for the estimate of the correlation matrix $R_b$:

$$\hat{R}_b = \frac{1}{M} \sum_{k=1}^{M} b(t_0 + kT_e) b^+(t_0 + kT_e) \tag{55}$$

There are a number of possible choices for estimating W, in particular for estimating the inverse of $R_b$. Among these, a method is proposed which is based on the eigenvector/eigenvalue decomposition of $R_b$, namely:

$$R_b = UDU^+ \tag{56}$$

with U the matrix of the orthonormal eigenvectors and D the diagonal matrix of the eigenvalues $\lambda_i$.

After this decomposition, the expression for W in the frequency domain becomes:

$$W(f) = UD^{-1}U^+ G(f) \tag{57}$$

This decomposition of W makes it possible to identify the various processing steps involved in the filtering structure depicted in FIG. 11.

The expression for the filtered signal in the time domain therefore becomes:

$$y(t) = W^+(-t) x(t) \tag{58}$$

with $W^+(-t) = G^+(-t) U^+ D^{-1} U \tag{59}$

The ASTF-TWN-DFE method which has just been described can therefore be summarized as filtering adapted to each path not on the received signal directly, but after preprocessing for spatial whitening of its component: background noise+interference source; at the end of the processing system, the paths formed in this way are added after having weighted each path by a coefficient inversely proportional to the modulus of the eigenvalue of the correlation matrix of the associated noise+interference source component.

The processing operations are divided up sequentially as follows:

channel estimation on signals, affected by interference, on each path, estimation of the correlation matrix of the noise+interference source component $R_b$, estimation of the preprocessing matrix (matrix of the eigenvectors of the correlation matrix $R_b$)

preprocessing: projection of the received signal and of the impulse responses of the estimated channels on the eigenvector base, filtering adapted to the projected channels on each path to rephase the possible multiple routes, combinations of different paths, each being assigned a weighting inversely proportional to the modulus of the corresponding eigenvalue so that the components corresponding to the interference sources (maximum eigenvalues) are taken into account with minimal weighting in the combination, and vice versa, suppression of the intersymbol interference and decision by a DFE processing module adapting to a criterion of minimizing the mean square error, between a soft decision and a hard decision.

The concatenation of the processing and of the filtering constitutes a spatio-temporal filtering structure which differs from purely spatial filtering by its capacity to rephase the decorrelated multiple routes of the useful signal.

Although this method is sub-optimal in terms of exploiting the antenna base, when there are multiple routes in the interference signals, it has the advantage that it does not need long learning sequences (adaptation of the spatio-temporal filters carried out independently on each path at the output of the preprocessing), the defining criterion for this parameter being the maximum temporal spread of the channel.

As regards the third structure, relating to the implementation of the ASTF-DFE adaptation method for a spatio-temporal filtering structure, no restrictive assumption regarding the statistical characteristics of the noise has been made.

Its principle consists in jointly optimizing a spatio-temporal filter and the recursive part of a decision feedback equalizer (DFE) on an overall criterion of minimizing the mean square error (MSE) between the soft decision at the output of the equalizer and either the learning sequence (at the start of the process) or the hard decision (later).

The various elements of this structure and their arrangement are depicted in FIG. 12.

The equalizer output signal $\tilde{z}(t$ (soft decision) is therefore expressed as follows as a function of the multi-sensor signal x(t):

$$\tilde{z}(n) = \sum_{k=1}^{N} W_k^+ x_k(n) - \sum_{l=1}^{N_{HR}} HR^*(l)\tilde{z}(n-l) \quad (60)$$

where $W_k$ denotes the temporal filter applied to path k, $x_k(n)=[x_k(nT), x_k(nT+T_e), \ldots, x_k(nT+(N_{HR}-1)T_e)]^T$ denotes the memory of the filter $W_k$ on path k.

The MSE, which is the adopted minimization criterion, is expressed as a function of the previous expression:

$$\xi = E[|\tilde{z}(t)-\hat{z}(t)|^2] \quad (61)$$

This criterion is estimated in accordance with the type of channel present:

for a steady channel:

$$\hat{\xi}(n) = \frac{1}{n}\sum_{i=1}^{n} |\tilde{z}(i) - \hat{z}(i)|^2 \quad (62)$$

for a non-steady channel:

$$\hat{\xi}(n) = \frac{1}{n}\sum_{i=1}^{n} \lambda^{(n-i)}|\tilde{z}(i) - \hat{z}(i)|^2 = \lambda\hat{\xi}(n-1) + |\tilde{z}(n) - \hat{z}(n)|^2 \quad (63)$$

with the forget factor $\lambda$ ($0<\lambda\leq 1$) to be set as a function of the degree to which the channel is non-steady.

Numerous algorithms for estimating all the filters ($W_k$ with k=1 to N, and HR) lead at each iteration to minimization of the MSE, examples of which include the recursive least squares (RLS) algorithm, the gradient algorithms (Stochastic Gradient, Conjugate Gradients, etc.) and especially the "Recursive Modified Gram Schmidt" algorithm (described in the Telecom thesis by J. L. Fety) which is without doubt currently the most suitable algorithm for making this estimate, in view of its convergence speed and its numerical stability.

Simulations have confirmed the superiority of this method over the method referred to as ASTF-TWN-DFE in channel configurations where there are interference sources with multiple routes (temporally correlated noise+interference source component).

However, this advantage has a cost in terms of the length of the reference sequence needed to make the overall estimate of all the coefficients of the filtering structure converge.

The following table presents the main advantages and drawbacks of the methods presented above:

|  | Spatial filter | Spatio-temporal filter | |
| --- | --- | --- | --- |
| Method | ASF-DFE | ASTF-TWN-DFE | ASTF-DFE |
| Advantages | low degree of complexity | rephases the useful multiple routes | quasi-optimal processing regard-less of the channel |
|  | short learning sequence | short learning sequence | needs only one spatial degree of freedom per interference source (regardless of the number of routes) |
| Drawbacks | sub-optimal in the presence of useful multiple routes | moderate complexity | moderate complexity |
|  | needs one spatial degree of freedom per independent interference route | sub-optimal in the presence of multiple interference routes | long learning sequence |

Depending on the problem to be tackled:
configuration of the useful routes,
number and configuration of the interference sources,
length of the learning sequence,
number of sensors,
processing means which may be envisaged,
the method having the best costs/performance compromise should be analysed.

The space division multiplexing in transmission according to the second variant of the invention follows the same principle as that described in the case of the first variant of the invention, with illustration by FIG. 4a in place of FIG. 4b.

The present invention applies more particularly to base stations, although some aspects of the method according to the invention which has just been described may find applications in mobile units, in particular as regards increasing their reception sensitivity.

The principle of the first variant of the present invention is not limited to mobile units, but may also be applied to fixed secondary stations remote from the base station.

The DFE equalizer used in the second variant of the present invention may be replaced by an equalizer based on the maximum likelihood principle, using the Viterbi algorithm.

What is claimed is:

1. A method for space division multiplexing and demultiplexing of radio signals which are organized in frames and are transmitted in duplex between at least one base station and a plurality of mobile units communicating on a same frequency and time channel using a multipath receiver and transmitter integrated in the at least one base station and coupled to an antenna base, said method for non-gaussian radio signals comprising:

estimating spatial information relating to each mobile unit based on a radio signal received from a mobile unit in a single-transmission configuration by the multipath receiver, for reception and transmission frequencies using blind source separation methods, and based on the estimated spatial information;

isolating by spatial filtering, possibly in a presence of multiple routes in a channel, respective routes to each mobile unit whose power is greater than a predetermined threshold to perform space division demultiplexing; and simultaneously transmitting in a direction of a main route of each mobile unit, a signal which is intended for the mobile unit, while protecting each mobile unit from signals transmitted to other mobile units by spatial filtering with cancelling constraints to perform the space division multiplexing.

2. The method according to claim 1, further comprising:

permuting, in each frame, the transmission and reception frequencies to acquire the spatial information on the transmission and reception frequencies when the transmission and reception frequencies are too far apart for the spatial information to be transposable from one to the other.

3. Then method according to claim 1, further comprising:

for optimizing an efficiency of the space division multiplexing and dermultiplexing, managing assignment of the channels in all frequency and time resources allocated to the at least one base station as a function of movements of the plurality of mobile units using a criterion of spatial correlation between the plurality of mobile units incorporating the spatial information acquired on the transmission and reception frequencies used alternately for the duplex transmission.

4. The method according to claim 1, wherein the spatial filtering, when transmitting a radio signal intended for a determined mobile unit, is adapted based on a synthetic correlation matrix for noise and interference source signal, established based on pairs of fictitious interference sources arranged spatially on either side of the determined mobile unit in a direction of which the at least one base station should not transmit the radio signal, so as to widen holes of a radiation diagram in a direction of the fictitious interference sources and to increase a tolerance with respect to aiming errors due to residual errors in setting transmission and reception paths.

5. The method according to claim 1, further comprising:

periodically applying a procedure for setting transmission and reception channels of each path formed by the antenna base and for pre-correcting a gain on transmission to limit the aiming errors in transmission.

6. A device for implementing a method for space division multiplexing and demultiplexing of radio signals which are organized in frames and are transmitted in duplex between at least one base station and a plurality of mobile units communicating on a same frequency and time channel using a multipath receiver and transmitter integrated in the base station and coupled to an antenna base, in which the method for non-gaussian radio signals includes estimating spatial information relating to each mobile unit based on a radio signal received from a mobile unit in a single-transmission configuration by the multipath receiver, for reception and transmission frequencies using blind source separation methods, and based on the estimated spatial information isolating by spatial filtering, possibly in a presence of multiple routes in a channel, respective routes to each mobile unit whose power is greater than a predetermined threshold to perform space division demultiplexing, and simultaneously transmitting in a direction of a main route of each mobile unit, a signal which is intended for the mobile unit, while protecting each mobile unit from signals transmitted to other mobile units by spatial filtering with cancelling constraints to allow the space division multiplexing, said device comprising:

switching and setting mechanisms coupled to said antenna base;

said multipath receiver including a frequency transposition mechanism an amplification mechanism and a analogue/digital conversion mechanism, coupled to an output of the switching and setting mechanisms;

a space division demultiplexer coupled to an output of the multipath receiver and including a predetermined number of spatial filters, each spatial filter forming one spatial channel;

a predetermined number of demodulators equal to a number of spatial channels determined per frequency and time channel coupled to an output of the demultiplexer, and configured to supply the at least one base station with data transmitted by the plurality of mobile units;

a predetermined number of modulators equal to a number of the demodulators, respectively receiving data received from the at least one base station and to be transmitted by the at least one antenna base to the plurality of mobile units;

a space division multiplexer coupled to an output of the modulators and including a predetermined number of spatial filters equal to a number of the modulators;

a multipath transmitter including an analog/digital conversion mechanism, a frequency transposition mechanism and an amplification mechanism coupled to an output of the space division multiplexer; and an SDMA digital processing module including an SDMA controller and an SDMA estimator configured to estimate direction vectors of routes relating to the plurality of mobile units based on the signal received from the mobile unit in single-transmission configuration, the plurality mobile units communicating with the at least one base station, and configured to update weightings of the spatial filters on transmission and reception, to manage the transmission and reception frequencies, and to control the switching and setting mechanisms.

7. The device according to claim 6, wherein the setting mechanism includes for each respective path a transmission system and a reception system formed by each antenna included in the antenna base;

a filter configured to equalize the transmission signal and being coupled to an input of the transmission system;

a filter configured to equalize the reception signal and being coupled to an output of the reception system;

a switch at the input and output of the reception system, a switch at the input of the transmission system and a two-way switch at the output of the transmission system, and configured to change to various operating modes including at least one of reception setting, transmission setting, and transmission/reception;

a coupler arranged between the antenna and the two-way switch, and configured to sample a part of the transmission signal and to inject the part of the transmission signal at the input of the reception system via the input switch of the reception system;

a setting analyzer configured to analyze various setting signals arriving on the input and output switches, respectively, of the transmission and reception systems, and to adapt the equalizing filters of the transmission and reception systems.

8. The device according to claim 7, further comprising:

a filter configured to pre-correct the transmission system arranged between an equalizing filter of the transmission system and the reception system.

9. The device according to claim 6, further comprising:

a frequency permutation controller coupled respectively to the multipath receiver and transmitter, and to the switching and setting mechanisms and configured to permute the transmission and reception frequencies on a same frequency channel.

10. A method for space division multiplexing and demultiplexing of digital radio signals organized in frames, including sequences which are known a priori and are transmitted in duplex between at least one base station and a plurality of mobile units communicating on a same frequency and time channel using a multipath receiver and transmitter integrated in the at least one base station and coupled to an antenna base, said method comprising:

estimating spatial information relating to each mobile unit based on a radio signal received from a mobile unit in a single-transmission configuration by the multipath receiver, for reception and transmission frequencies using filtering methods while utilizing the a priori known sequences, and based on the estimated spatial information:

isolating, possibly in a presence of multiple routes in a channel, respective routes to each mobile unit whose power is greater than a predetermined threshold, and demodulating the received signal of each of the plurality of mobile units in contact with the at least one base station to perform the space division demultiplexing; and simultaneously transmitting in a direction of a main route of each mobile unit, a signal which is intended for the mobile unit, while protecting each mobile unit from signals transmitted to other mobile units by spatial filtering with cancelling constraints to perform the space division multiplexing.

11. The method according to claim 10, further comprising:

isolating the main routes by spatial filtering.

12. The method according to claim 11, wherein the spatial filtering is implemented by an ASF structure associated with a decision and equalization component.

13. The method according to claim 10, further comprising:

isolating the main routes by spatio-temporal filtering.

14. The method according to claim 13, wherein the spatio-temporal filtering is implemented by an STAF-TWN structure associated with a decision and equalization component.

15. The method according to claim 12, wherein the decision and equalization component is implemented by a DFE.

16. The method according to claim 12, wherein the decision and equalization component is implemented by a Viterbi algorithm.

17. The method according to claim 13, wherein the spatio-temporal filtering is implemented by an STAF-TWN structure.

18. The method according to claim 10, wherein the spatial information is estimated based on a value taken by a multipath detection function of the a priori known sequence, at an optimum synchronization time corresponding to a arrival time of a most powerful route.

19. The method according to claim 10, further comprising:

permuting, in each frame, the transmission and reception frequencies to acquire the spatial information on the transmission and reception frequencies when the transmission and reception frequencies are too far apart for the spatial information to the transposable from one to the other.

20. The method according to claim 10, further comprising:

for optimizing an efficiency of the space division multiplexing and demultiplexing, managing assignment of the channels in all frequency and time resources allocated to the at least one base station as a function of movements of the plurality of mobile units using a criterion of spatial correlation between the plurality of mobile units incorporating the spatial information acquired on the transmission and reception frequencies used alternately for the duplex transmission.

21. The method according to claim 10, wherein the spatial filtering, when transmitting a radio signal intended for a determined mobile unit, is adapted based on a synthetic correlation matrix for a noise and interference source signal, established based on pairs of fictitious interference sources arranged spatially on either side of the determined mobile unit in a direction of which the at least one base station should not transmit the radio signal, so as to widen holes of a radiation diagram in a direction of the fictitious interference sources and to increase a tolerance with respect to aiming errors due to residual errors in setting transmission and reception channels.

22. The method according to claim 10, further comprising:

periodically applying a procedure of setting and of pre-correction of amplification on transmission to limit the aiming errors in transmission.

23. A device for implementing a method for space division multiplexing and demultiplexing of digital radio signals organized in frames, including sequences which are known a priori and are transmitted in duplex between at least one base station and a plurality of mobile units communicating on a same frequency and time channel using a multipath receiver and transmitter integrated in the at least one base station and coupled to an antenna base, in which the method includes estimating spatial information relating to each mobile unit based on a radio signal received from a mobile unit in a single-transmission configuration by the multipath receiver, for reception and transmission frequencies using filtering methods while utilizing the a priori known sequences, and based on the estimated spatial information isolating, possibly in a presence of multiple routes in a channel, respective routes to each mobile unit whose power is greater than a predetermined threshold, and demodulating the received signal of each of the plurality of mobile units in contact with the at least one base station to perform the space division demultiplexing: and simultaneously transmitting in a direction of a main route of each mobile unit, a signal which is intended for the mobile unit, while protecting each mobile unit from signals transmitted to other mobile units by spatial filtering with cancelling constraints to perform the space division multiplexing, said device comprising:

switching and setting mechanisms coupled to said antenna base;

said multipath receiver including a frequency transposition mechanism, an amplification mechanism and an analogue/digital conversion mechanism coupled to an output of the switching and setting mechanisms;

a space division demultiplexer coupled to an output of the multipath receiver and including a pedetermined number of spatial or spatio-temporal filters, each spatial or spatio-temporal filter forming one spatial or spatio-temporal channel;

a predetermined number of demodulators equal to a number of spatial channels determined per frequency and time channel coupled to an output of the demultiplexer, and configured to supply the at least one base station with data transmitted by the pluralit of mobile units;

a predetermined number of modulators equal to a number of the demodulators, respectively receiving data to be transmitted by the antenna base to the plurality of mobile units;

a space division multiplexer coupled to an output of the modulators and including a predetermined number of spatial filters equal to a number of the modulators;

a multipath transmitter including a digital/analog mechanism, a frequency transposition mechanism and an amplification mechanism coupled to an output of the space division multiplexer; and an SDMA digital processing module including an SDMA controller and an SDMA estimator configured to estimate direction vectors of routes relating to the plurality of mobile units based on the signal received from the mobile unit in single-transmission configuration, the pluralit of mobile units communicating with the at least one base station, and configured to update weightings of the spatial filters on transmission and spatial or spatio-temporal filters on reception, to manage the transmission and reception frequencies, and to control the switching and setting mechanisms.

24. The device according to claim 23, wherein the setting mechanism includes, for each respective, path a transmission system and a reception system formed by each antenna included in the antenna base;

a filter configured to equalize the transmission signal and being coupled to an input of the transmission system;

a filter configured to equalize the reception signal and being coupled to an output of the reception system;

a switch at the input and output of the reception system, a switch at the input of the transmission system and a two-way switch at the output of the transmission system, and configured to change to various operating modes including at least one of reception setting, transmission setting, and transmission/reception;

a coupler arranged between the antenna and the two-way switch, and configured to sample a part of the transmission signal and to inject the part of the transmission signal to the input of the reception system via the input switch of the reception system;

a setting analyzer mechanism configured to analyze various setting signals arriving on the input and output switches, respectively, of the transmission and reception systems, and to adapt the equalizing filters of the transmission and reception systems.

25. The device according to claim 24, further composing:

a filter configured to pre-correct the transmission system arranged between an equalizing filter of the transmission system and the reception system.

26. The device according to claim 23, further comprising:

a frequency permutation controller coupled respectively to the multipath receiver and transmitter, and to the switching and setting mechanisms and configured to permute the transmission and reception frequencies on a same frequency channel.

* * * * *